(12) United States Patent
Saitaka et al.

(10) Patent No.: US 10,071,845 B2
(45) Date of Patent: Sep. 11, 2018

(54) PAPER-MADE CONTAINER AND METHOD FOR PREPARING THE PAPER-MADE CONTAINER

(71) Applicant: DIXIE JAPAN LTD., Tokyo (JP)

(72) Inventors: Kiyoshi Saitaka, Tokyo (JP); Katsuji Nishihashi, Tokyo (JP); Atsushi Oikawa, Tokyo (JP); Tatsuya Koya, Tokyo (JP)

(73) Assignee: DIXIE JAPAN LTD., Tokyo (JP)

( * ) Notice: Subject to any disclaimer, the term of this patent is extended or adjusted under 35 U.S.C. 154(b) by 114 days.

(21) Appl. No.: 14/787,748

(22) PCT Filed: May 12, 2014

(86) PCT No.: PCT/JP2014/062580
§ 371 (c)(1),
(2) Date: Oct. 28, 2015

(87) PCT Pub. No.: WO2015/045474
PCT Pub. Date: Apr. 2, 2015

(65) Prior Publication Data
US 2016/0194138 A1    Jul. 7, 2016

(30) Foreign Application Priority Data
Sep. 30, 2013 (JP) ................ 2013-204837

(51) Int. Cl.
*B65D 81/38* (2006.01)
*B31D 5/00* (2017.01)
(Continued)

(52) U.S. Cl.
CPC .......... *B65D 81/3874* (2013.01); *B31B 70/00* (2017.08); *B31D 5/0086* (2013.01);
(Continued)

(58) Field of Classification Search
CPC .. B65D 81/3874; B31D 5/0086; B32B 27/08; B32B 27/10; B32B 1/08; B32B 2439/02; B31B 70/00
See application file for complete search history.

(56) References Cited

U.S. PATENT DOCUMENTS 4,268,567 A   5/1981 Harmony
6,277,454 B1  8/2001 Neale et al.
(Continued)

FOREIGN PATENT DOCUMENTS

CN   1184062 A     6/1998
CN   201737320 U   2/2011
(Continued)

OTHER PUBLICATIONS

Office Action dated in corresponding Korean application 10-2015-7025161 dated Nov. 9, 2015.
(Continued)

*Primary Examiner* — Michael C Miggins
(74) *Attorney, Agent, or Firm* — Griffin and Szipl PC

(57) ABSTRACT

A paper-made container, in which it is unlikely to feel the heat at the time of holding the container with a hand and generation of poor appearance due to excessive expansion is prevented, without increasing the thickness of an expanded insulating layer and not resulting in a corresponding deterioration of transporting efficiency, and a method for preparing the paper-made container are provided. The paper-made container of the present invention comprises a container main body consisting of a barrel portion and a bottom plate portion, and an expanded insulating layer consisting of an expanded portion and an expansion-inhibited portion, provided on the side of the outer surface of the barrel portion, in which the expanded insulating layer is formed by heating a thermoplastic resin layer having an expansion inhibiting ink-coated portion, and the ratio of the (Continued)

thickness of the expansion-inhibited portion to the thickness of the expanded portion is 25% or less.

15 Claims, 10 Drawing Sheets

(51) Int. Cl.
  *B32B 27/08* (2006.01)
  *B32B 27/10* (2006.01)
  *B32B 1/08* (2006.01)
  *B31B 70/00* (2017.01)
(52) U.S. Cl.
  CPC ............... *B32B 1/08* (2013.01); *B32B 27/08* (2013.01); *B32B 27/10* (2013.01); *B32B 2439/02* (2013.01)

(56) References Cited

U.S. PATENT DOCUMENTS

| | | | |
|---|---|---|---|
| 2010/0196610 | A1 | 8/2010 | Chang et al. |
| 2011/0101083 | A1 | 5/2011 | Matsuzaki et al. |

FOREIGN PATENT DOCUMENTS

| | | | |
|---|---|---|---|
| JP | 4-102208 | U | 9/1992 |
| JP | 5-318612 | A | 12/1993 |
| JP | 6-220134 | A | 8/1994 |
| JP | 7-310043 | A | 11/1995 |
| JP | 2573677 | B2 | 10/1996 |
| JP | 10-180917 | A | 7/1998 |
| JP | 2000-043954 | A | 2/2000 |
| JP | 2000-085852 | A | 3/2000 |
| JP | 2000-118519 | A | 4/2000 |
| JP | 2003-128161 | A | 5/2003 |
| JP | 2008-132780 | A | 6/2008 |
| KR | 10-0371631 | | 10/2003 |
| TW | 356462 | | 4/1999 |

OTHER PUBLICATIONS

Office Action dated May 28, 2015 in corresponding Chinese application 201480000386.4, with translation of Search Report.
Office Action dated in corresponding European application 14758274.6 dated Nov. 23, 2017.
Office Action dated in co-pending Korean application 10-2016-70104414 dated Feb. 14, 2018.
International Search Report issued in corresponding application PCT/JP2014/062580, completed Jul. 18, 2014 and dated Aug. 5, 2014.
Office Action dated Jan. 14, 2014 in Japanese priority application 2013-204837.
Notice of Allowance issued in corresponding Taiwanese application 103119922, dated May 4, 2015.
Office Action dated May 28, 2015 in corresponding Chinese application 20140000386.4, with translation of Search Report.
Extended European Search Report in corresponding application 14758274.6, completed Jun. 29, 2015 and dated Jul. 7, 2015.

PAPER-MADE CONTAINER AND METHOD FOR PREPARING THE PAPER-MADE CONTAINER

This is a National Phase Application in the United States of International Patent Application No. PCT/JP2014/062580 filed May 12, 2014, which claims priority on Japanese Patent Application No. 2013-204837, filed Sep. 30, 2013. The entire disclosures of the above patent applications are hereby incorporated by reference.

TECHNICAL FIELD

The present invention relates to a paper-made container and a method for preparing the paper-made container.

Priority is claimed on Japanese Patent Application No. 2013-204837, filed on Sep. 30, 2013, the content of which is incorporated herein by reference.

BACKGROUND ART

As a container for storing a heated beverage, food prepared by heating, or the like, a paper-made container imparted with an insulating property is often used.

As an insulating paper-made container in the prior art, an insulating paper-made container having a double structure, constituted of a paper container main body and a paper-made tubular body fitted an outside of a barrel portion of the paper container main body, in which a space for insulation is formed between the paper container main body and the paper-made tubular body (see, for example, PTL 1), or an insulating paper-made container having an embossed paper-made insulating sheet attached to an outer periphery of a barrel portion of a paper-made main body, has been known (see, for example, PTL 2).

The insulating effect in an insulating paper-made container having a double structure constituted of a paper container main body and a paper-made tubular body is increased as the distance between the paper container main body and the paper-made tubular body is increased. In the insulating paper-made container described in PTL 1, a rib protruding to the side of the outer surface is formed on the barrel portion of the paper container main body, and the rib serves as a spacer to ensure a gap between the paper container main body and the paper-made tubular body. In order to increase the distance between the paper container main body and the paper-made tubular body, it is necessary to increase the distance of the peak and the trough of the rib provided on the barrel portion of the paper container main body by making a deep rib. However, the deep rib needs a significant extension of a paper substrate, and thus, the paper substrate may become easily breakable. Further, since the paper-made container protrudes outside significantly by the deep rib process, it tends to be difficult to separate the paper containers when pressurization of the bundles of the paper-made container occurs during transportation. If the bottom space of the paper-made container is increased in order to prevent such a problem, the stacked height is increased even when with the same number of paper-made containers, and the number of the paper-made containers able to be stored in a cardboard container is thus decreased, resulting in a problem such as a deterioration of transporting efficiency. For the same reason as above, the depth of the rib in practical use is decreased, and thus, a sufficient insulating property is not attained.

Furthermore, also in the insulating paper-made container having an embossed paper-made insulating sheet attached to an outer periphery of a barrel portion of a paper-made main body, described in PTL 2, the insulating effect is increased as the distance from the peak to the trough of the embossment is increased. In order to increase the distance from the peak to the trough of the embossment, it is necessary to make a deep embossment, and the deep embossment needs a significant extension of a paper substrate, and thus, the paper substrate may become easily breakable and it is difficult to steepen the angle connecting the peak and the trough of the embossment. Further, since the paper-made container protrudes outside significantly by the deep embossment, it tends to be difficult to separate the paper-made containers when pressurization of the bundles of the paper-made container occurs during transportation. If the bottom space of the paper-made container is increased in order to prevent such a problem, the stacked height is increased even with the same number of the paper-made containers, and the number of the paper-made containers able to be stored in a cardboard container is decreased, resulting in a problem such as a deterioration of transporting efficiency. For the same reason as above, the depth of the embossment in practical use is decreased, and thus, a sufficient insulating property is not attained, as in a case of the paper-made container described in PTL 1 above.

Furthermore, in order to enhance the insulating effect in an insulating paper-made container, it is proposed to make a double structure having a fitted paper-made tubular body so as to form a predetermined gap between an outer periphery of a barrel portion of a paper container main body and the paper-made tubular body, and the paper-made tubular body is embossed to increase the distance between the paper container main body and the paper-made tubular body (see, for example, PTL 3).

However, since the insulating paper-made container described in PTL 3 has a double structure, it has a problem in that the cost of materials as well as the number of the preparation steps are increased, resulting in an increase in preparation cost.

As an insulating paper-made container, in addition to the insulating paper-made container having the double structure as described above, an expanded insulating paper-made container consisting of a barrel member and a bottom member, in which an expanded insulating layer formed by expanding a thermoplastic resin layer is formed on the side of the outer surface of the barrel member, has been known (see, for example, PTL 4).

The expanded insulating paper-made container is a container, in which a barrel member of the container having the low-melting point thermoplastic resin layer side as an outer side is formed by using a processed paper having a low-melting point thermoplastic resin layer, which is expanded by heating, provided on one surface of a paper substrate and a high-melting point thermoplastic resin layer provided on the other side, and the low-melting point thermoplastic resin layer is expanded by heating to expand and insulate the outside of the barrel member. As compared with the insulating paper-made container having the double structure as described above, the number of the preparation steps is small, easiness of the preparation, reduction in the cost, and the like are promoted, and further, by increasing the thickness of the low-melting point thermoplastic resin layer to be expanded or by increasing the moisture amount of the paper substrate, the expanded insulating layer can be thickened and thus the insulating property can be improved.

CITATION LIST

Patent Literature

[PTL 1] Japanese Unexamined Patent Application, First Publication No. 2000-85852
[PTL 2] Japanese Unexamined Patent Application, First Publication No. 2000-43954
[PTL 3] Japanese Unexamined Patent Application, First Publication No. 2000-118519
[PTL 4] Japanese Unexamined Patent Application, First Publication No. 2003-128161

SUMMARY OF INVENTION

Technical Problem

However, in the expanded insulating paper-made container described in PTL 4, if the thickness of a low-melting point thermoplastic resin layer to be expanded is increased in order to increase the thickness of an expanded insulating layer, there arises a problem in that the cost is significantly increased. In addition, since the thickness of the low-melting point thermoplastic resin layer is increased, the paper-made container protrudes outside significantly, and thus it tends to be difficult to separate the paper containers by the occurrence of pressurization of the bundles of the paper-made container during transportation. If the bottom space of the paper-made container is increased in order to prevent such a problem, the stacked height is increased even with the same number of the paper-made containers and the number of the paper-made containers stored in a cardboard container is decreased, resulting in a problem such as deterioration in efficiency of transportation.

Furthermore, if the moisture amount of the paper substrate is increased, there arises a problem in that it is difficult to smoothen the expanded surface uniformly, expansion of large grains in the blister shape (hereinafter referred to as excessive expansion) easily occurs, and accordingly, the appearance is deteriorated.

The present invention has been made, taking into account the circumstances as described above. The present invention solves the problems of a paper-made container having a double structure or embosses, and then provides a paper-made container, in which it is unlikely to receive a heat sensation at the time of holding the container with a hand and generation of poor appearance due to excessive expansion is prevented, without increasing the thickness of an expanded insulating layer and thus without increasing in cost and deterioration of transporting efficiency. The present invention also provides a method for preparing the paper-made container.

Solution to Problem

The present inventors have conducted extensive studies in order to solve the above-described problems, and as a result, they have found that an expanded insulating paper-made container, in which the insulating property is not reduced, the cost is maintained, and excessive expansion is not generated by decreasing the area of an expanded insulating layer in contact with a hand, can be obtained, thereby completing the present invention.

Thus, the present invention provides a paper-made container and a method for preparing the paper-made container, having the following characteristics.

(1) A paper-made container comprising:
a container main body consisting of a barrel portion and a bottom plate portion, and
an expanded insulating layer consisting of an expanded portion and an expansion-inhibited portion, provided on the side of the outer surface of the barrel portion, in which the expanded insulating layer is formed by heating a thermoplastic resin layer having an expansion inhibiting ink-coated portion, and the ratio of the thickness of the expansion-inhibited portion to the thickness of the expanded portion which is not subjected to expansion inhibition is 25% or less.

(2) The paper-made container as described in (1), in which the thermoplastic resin layer is formed by lamination of a low-melting point thermoplastic resin layer and a less expansion-inhibited, printed layer in this order from the side of the barrel portion.

(3) The paper-made container as described in (1) or (2), in which the expansion inhibiting ink-coated portion contains a resin having a glass transition point of 30° C. or higher in the amount of 90% by mass or more in the dry state.

(4) The paper-made container as described in (3), in which the resin having a glass transition point of 30° C. or higher is at least one selected from the group consisting of an acryl-based resin, a cellulose-based resin, a vinyl chloride-vinyl acetate copolymer, a vinyl chloride-vinyl acetate-maleic acid copolymer, a UV-curable resin, and a urethane resin.

(5) The paper-made container as described in (3) or (4), in which the resin having a glass transition point of 30° C. or higher is a vinyl chloride-vinyl acetate copolymer or a vinyl chloride-vinyl acetate-maleic acid copolymer, and the proportion of vinyl acetate in the vinyl chloride-vinyl acetate copolymer or the vinyl chloride-vinyl acetate-maleic acid copolymer is 20% by mass or less.

(6) The paper-made container as described in any one of (1) to (5), in which the expansion inhibiting ink-coated portion contains a colorant in the amount of 30% by mass or less in the dry state.

(7) The paper-made container as described in any one of (1) to (6), in which the depth of a concave portion formed of the expanded portion and the expansion-inhibited portion is 200 μm or more.

(8) The paper-made container as described in any one of (1) to (7), in which the shape of the concave portion formed of the expanded portion and the expansion-inhibited portion is a dot shape having a diameter of 0.1 mm to 0.7 mm, a linear or lattice shape having a width of 0.1 mm to 0.7 mm, or a shape formed by a combination thereof.

(9) The paper-made container as described in any one of (1) to (8), in which the width of a convex portion formed of the expanded portion and the expansion-inhibited portion is from 1.5 mm to 10 mm.

(10) The paper-made container as described in any one of (1) to (9), in which the proportion of the outer surface area of the concave portion in the outer surface area of the barrel portion is from 1% to 55%.

(11) A method for preparing a paper-made container, comprising:
a step A in which a thermoplastic resin layer is provided on one surface of a paper substrate,
a step B in which an expansion-inhibited ink is coated on a part of a surface of the thermoplastic resin layer, on the side opposite to the surface in contact with the paper substrate, in order to form an expansion inhibiting ink-coated portion, and
a step C in which the thermoplastic resin layer having the expansion inhibiting ink-coated portion is heated, a portion not provided with the expansion inhibiting ink-coated portion in the thermoplastic resin layer is expanded and an expanded portion and an expansion-inhibited portion is formed, in which the expansion-inhibited ink contains a resin having a glass transition point of 30° C. or higher in an amount of 7% by mass or more.

(12) The method for preparing a paper-made container as described in (11), in which the step A, a low-melting point thermoplastic resin layer is provided on one surface of the paper substrate, and then a less expansion-inhibited, printed layer is further provided on the low-melting point thermoplastic resin layer.

(13) The method for preparing a paper-made container as described in (11) or (12), in which the resin having a glass transition point of 30° C. or higher is at least one selected from the group consisting of an acryl-based resin, a cellulose-based resin, a vinyl chloride-vinyl acetate copolymer, a vinyl chloride-vinyl acetate-maleic acid copolymer, a UV-curable resin, and a urethane resin.

(14) The method for preparing a paper-made container as described in any one of (11) to (13), in which the resin having a glass transition point of 30° C. or higher is a vinyl chloride-vinyl acetate copolymer or a vinyl chloride-vinyl acetate-maleic acid copolymer, and the proportion of vinyl acetate in the vinyl chloride-vinyl acetate copolymer or the vinyl chloride-vinyl acetate-maleic acid copolymer is 20% by mass or less.

(15) The method for preparing a paper-made container as described in any one of (11) to (14), in which the expansion-inhibited ink contains a colorant in the amount of 7% by mass or less.

Advantageous Effects of Invention

According to the present invention, a paper-made container, in which a heat sensation at the time of holding the container with a hand and generation of poor appearance due to excessive expansion are prevented without increasing the thickness of an expanded insulating layer and without a corresponding increase in cost and deterioration of transporting efficiency, and a method for preparing the paper-made container, can be provided.

DESCRIPTION OF EMBODIMENTS

<Paper-Made Container>

The paper-made container of the present invention comprises a container main body consisting of a barrel portion and a bottom plate portion, and an expanded insulating layer consisting of an expanded portion and an expansion-inhibited portion, provided on the side of the outer surface of the barrel portion, in which the expanded insulating layer is formed by heating a thermoplastic resin layer having an expansion inhibiting ink-coated portion, and the ratio of the thickness of the expansion-inhibited portion to the thickness of the expanded portion is 25% or less.

Hereinafter, an example of an embodiment of the paper-made container according to the present invention will be described in detail with reference to the drawings.

Figure 1:
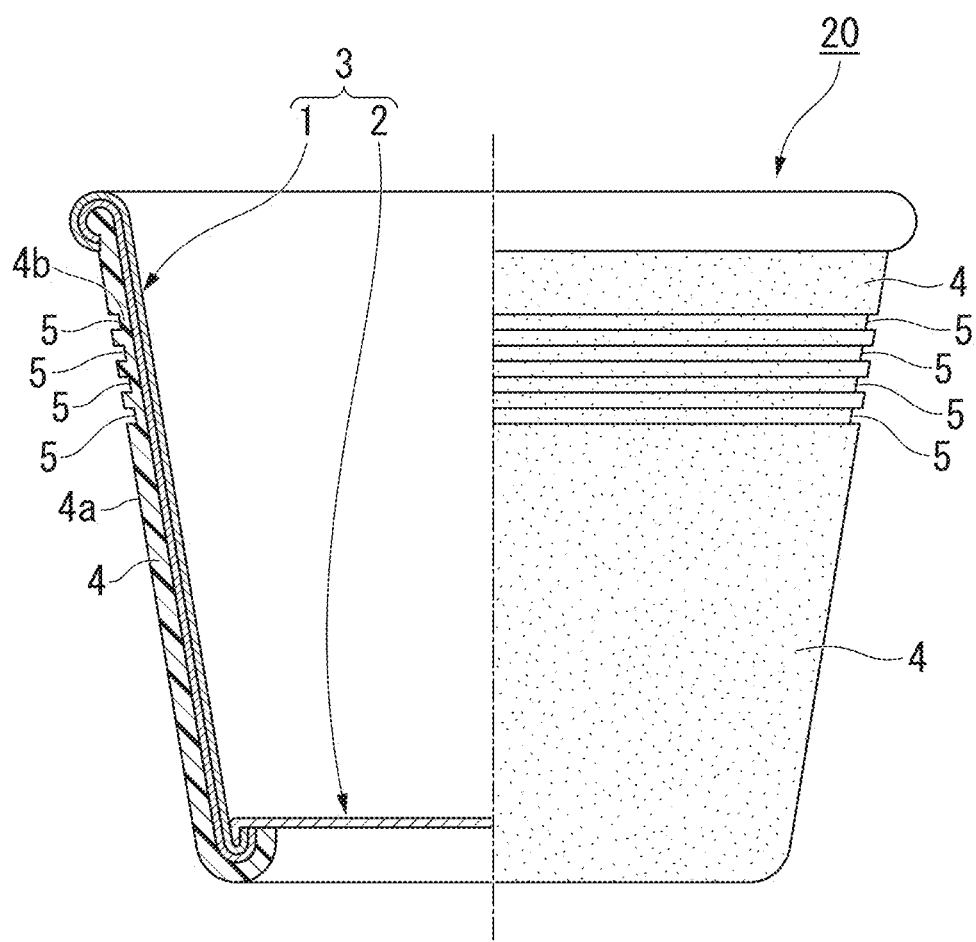
FIG. 1 is a half-cross-sectional front view showing an example of an embodiment of the expanded insulating paper-made container according to the present invention.

As shown in FIG. 1, a paper-made container 20 of the present embodiment is a container comprising a container main body 3 consisting of a barrel portion 1 and a bottom plate portion 2, and an expanded insulating layer 4 consisting of an expanded portion 4$a$ and an expansion-inhibited portion 4$b$, each provided on the side of the outer surface of the barrel portion 1. The expanded insulating layer 4 is formed by heating a thermoplastic resin layer having an expansion inhibiting ink-coated portion. Since the resin component in the expansion inhibiting ink-coated portion has more heat resistance than the thermoplastic resin layer, it is not easily expanded dimensionally during the heating. Therefore, by heating, an expanded portion 4$a$ is formed from a portion other than the expansion inhibiting ink-coated portion of the thermoplastic resin layer, and an expansion-inhibited portion 4$b$ is formed from the expansion inhibiting ink-coated portion.

Figure 3:
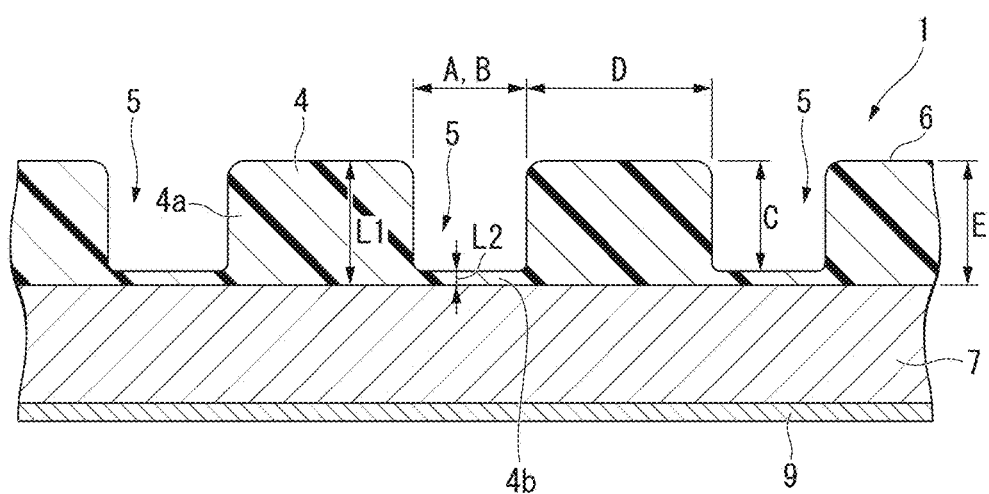
FIG. 3 is an enlarged explanatory cross-sectional view showing the relationship between an expanded insulating layer and a concave portion provided on a surface of the expanded insulating layer.

Furthermore, as shown in FIG. 3, the ratio of the thickness $L2$ of the expansion-inhibited portion 4$b$ to the thickness $L1$ of the expanded portion 4$a$ is 25% or less. Such a rate is inversely correlated with the expansion inhibiting rate of the expansion-inhibited ink as described later. That is, the expansion inhibiting rate is represented by the following equation (1).

[Equation 1]

$$\text{Expansion inhibiting rate (\%)} = 100 - 100 \times L2/L1 \tag{1}$$

Furthermore, as described later in <Method for Preparing Paper-Made Container>, in the thermoplastic resin layer, it is preferable that a low-melting point thermoplastic resin layer and a less expansion-inhibited, printed layer be laminated in this order from the side of the barrel portion.

The expansion inhibiting rate in such a case is a value obtained by taking the thickness of a less expansion-inhibited portion formed by heating the less expansion-inhibited, printed layer as $L1$ in the equation (1).

The expansion inhibiting rate is 75% or more, preferably 80% or more, more preferably 85% or more, and particularly preferably 90% or more.

By adopting an expansion inhibiting rate of 75% or more, it can be likely to receive a heat sensation at the time of holding the paper-made container with a hand without increasing the thickness of an expanded insulating layer and thus without deterioration of transporting efficiency, because an area of the expanded insulating layer which contacts with the hand is reduced.

Furthermore, since it is not necessary to increase the basis weight of the paper substrate used and thus to increase the thickness of the expanded insulating layer in order to impart an insulating property, the insulating property of the container can be improved without an increase in the cost of materials. Further, it is not necessary to increase the thickness of the expanded insulating layer by increasing the moisture amount of the paper substrate. When the moisture amount in the paper substrate is increased, it is difficult to uniformly smooth the expanded surface, and excessive expansion easily occurs, thereby deteriorating the appearance. However, with the paper-made container of the present embodiment, there is no concern of deterioration of the appearance.

Furthermore, as described later in Examples, by adopting an expansion inhibiting rate of 75% or more, frictionally charged voltage is less likely to occur. Therefore, the paper-made container of the present embodiment is not easily charged, and accordingly, when a single paper-made container is separated from a bundle of paper-made containers in a vending machine by a cup feeding device, failure in falling, such as a plurality of containers falling at once, a single paper-made container not falling in the state and so on, due to adherence of the separated "paper-made container" and "the bundle of the paper-made containers" by static electricity, is less likely to occur.

In a case where the paper-made container is easily charged by the friction between the paper-made containers due to vibration or the like when the paper-made containers are transported in the bundle state; or a case where the paper-made container is easily charged by the rubbing during the separation of a resin-made separation portion of the cup feeding device in the vending machine and an edge portion of the paper-made container, or the rubbing between the paper-made containers during the rotation of the paper-made containers, failure in falling such as a plurality of containers falling at once, a single paper-made container not falling, due to adherence of the separated "paper-made container" and "the bundle of the paper-made containers" by static electricity, is likely to occur. However, according to the paper-made container of the present embodiment, frictionally charged voltage is less likely to occur, and accordingly, such a problem does not occur.

The reason why the paper-made container of the present embodiment can inhibit the charged voltage is not clear, but it seems that the contact area rubbed by the irregularities of the expanded portion is decreased.

Furthermore, in a case where the resin contained in the expansion inhibiting ink-coated portion of the present invention as described later is a combination of a vinyl chloride-vinyl acetate copolymer and an acryl-based resin, other charged voltage inhibition effects can also be considered. Specifically, due to friction with polyethylene used in the expanded insulating layer, the acryl-based resin tends to be positively charged, while polyvinyl chloride tends to be negatively charged. Therefore, it is thought that an expansion-inhibited ink obtained by mixing the two has a charging inhibition effect in the friction with polyethylene.

Moreover, in a case of an expanded insulating container in which an expanded insulating layer (polyethylene layer) on the outer surface is expanded by the moisture in a base paper, or in a case of a double or triple container having a small bottom space, the stacked paper-made container having outer layers of the expanded insulating layer or the double or triple container is pressed to the inner surface of the paper-made containers piled up downward, by the mass of the paper-made container itself, the vibration during transportation, or the like. Then, the stacked paper-made container is contracted, a force pushing outward acts as a friction force, and therefore, the containers tend to be not easily pulled out. If the bottom space is enlarged, the stacked paper-made containers can be easily pulled out. However, the height of the same number of containers stacked is increased, the number of the paper-made containers able to be stored in a cardboard box is decreased and the transporting efficiency is deteriorated.

On the other hand, in the paper-made container of the present embodiment, due to the irregularities imparted on the expanded insulating layer and an expansion inhibiting rate of 75% or more, the force extending outside the expanded insulating layer is weaker than the force of an expanded insulating layer without irregularities, and therefore, such a problem does not occur even without increasing the bottom space.

Further, as described later in Examples, by adopting an expansion inhibiting rate of 75% or more, it is easy to separate the paper-made containers even when pressurization occurs on the bundle of the paper-made containers during the transportation.

Furthermore, by incorporating the expanded insulating layer, an insulating effect and a dew condensation preventing effect are attained.

In the present embodiment, the expansion inhibiting ink-coated portion 12 contains a resin, a colorant, and an auxiliary agent. It is preferable that the expansion inhibiting ink-coated portion 12 (see FIG. 4) contain a resin having a glass transition point of 30° C. or higher in the dry state, in the amount of 90% by mass or more. In the present embodiment, the expression "dry state" means a state where a solvent in an expansion-inhibited ink coated on a thermoplastic resin layer is evaporated. In the expansion inhibiting ink-coated portion 12 in the dry state, the proportion of the resin having a glass transition point of 30° C. or higher is preferably 90% by mass or more, more preferably 92% by mass or more, still more preferably 94% by mass or more, particularly preferably 96% by mass or more, and most preferably 98% by mass or more. In a case where the proportion of the resin having a glass transition point of 30° C. or higher is 90% by mass or more, the expansion inhibiting effect is high.

That is, the proportion of the resin and the colorant, each having a glass transition point of lower than 30° C., in the expansion inhibiting ink-coated portion 12 in the dry state is preferably less than 10% by mass, more preferably less than 8% by mass, still more preferably less than 6% by mass, particularly preferably less than 4% by mass, and most preferably less than 2% by mass.

Furthermore, the expansion inhibiting ink-coated portion 12 preferably contains a resin having a glass transition point of 30° C. or higher, more preferably contains a resin having a glass transition point of 40° C. or higher, and particularly preferably contains a resin having a glass transition point of 50° C. or higher, in the dry state.

Examples of the resin having a glass transition point of 30° C. or higher include at least one selected from the group consisting of an acryl-based resin, a cellulose-based resin, a vinyl chloride-vinyl acetate copolymer, a vinyl chloride-vinyl acetate-maleic acid copolymer, a UV-curable resin, and a urethane resin.

As the acryl-based resin having a glass transition temperature of 30° C. or higher, one having a glass transition temperature of 30° C. or higher can be selected from the conventionally known and used acryl-based resins for printing inks Examples thereof include acryl-based polymers constituted with acryl-based monomers as an essential monomer component. Examples of the monomer component constituting the acryl-based resin (acryl-based polymer) include linear or branched alkyl group-containing alkyl (meth)acrylate esters [preferably C1-12 alkyl (meth)acrylate esters and the like], such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, hexyl (meth)acrylate, octyl (meth)acrylate, 2-ethylhexyl (meth)acrylate, isononyl (meth)acrylate, decyl (meth)acrylate, and dodecyl (meth)acrylate; carboxyl group-containing polymerizable unsaturated compounds or anhydrides thereof, such as (meth)acrylic acid, crotonic acid, itaconic acid, fumaric acid, and maleic acid; and hydroxyl group-containing (meth)acrylic esters [preferably hydroxy-C1-8 alkyl (meth)acrylate esters and the like], such as 2-hydroxymethyl (meth)acrylate, 2-hydroxypropyl (meth)acrylate, 3-hydroxypropyl (meth)acrylate, 6-hydroxyhexyl (meth)acrylate, diethylene glycol mono(meth)acrylate, dipropylene glycol mono(meth)acrylate. Here, the term "(meth)acryl" means "acryl" and/or "methacryl".

Furthermore, in addition to those described above, cycloalkyl (meth)acrylate esters such as cyclohexyl (meth)acrylate; (meth)acrylic amide derivatives such as N-methylol (meth)acrylamide, N-butoxymethyl (meth)acrylamide, N,N-dimethyl (meth)acrylamide, N,N-diethyl (meth)acrylamide; dialkylaminoalkyl (meth)acrylate esters such as dimethylaminoethyl (meth)acrylate, diethylaminoethyl (meth)acrylate, dipropylaminoethyl (meth)acrylate, dimethylaminopropyl (meth)acrylate, and dipropylaminopropyl (meth)acrylate; styrene-based compounds such as styrene, vinyl toluene, and α-methylstyrene; vinyl esters such as vinyl acetate and vinyl propionate; vinyl halides such as vinyl chloride; vinyl ether such as methyl vinyl ether; cyano group-containing vinyl compounds such as (meth)acrylonitrile; and polymerizable unsaturated compounds including olefins such as ethylene and propylene, dienes, and the like can also be used as the monomer component.

Among these, those obtained by using acrylate esters or methacrylic esters as a main component and copolymerize them with various monomers such as acrylic acid, methacrylic acid, styrene, vinyl toluene, acrylamide, hydroxyethyl acrylate, and acrylonitrile are preferred. According to the differences in the copolymerization compositions and in the molecular weights, resins ranging widely from those having various softening points to those which are dissolved in aromatic hydrocarbons, esters, ketones, or the like or those which are dissolved in alcohols or aqueous alkaline solutions are obtained.

The mass average molecular weight of the acryl-based resin is not particularly limited, but it is preferably from 10,000 to 150,000, more preferably from 20,000 to 100,000, and particularly preferably from 40,000 to 95,000. In cases where the mass average molecular weight is 10,000 or more, the viscosity of the printing ink is not too low, and an effect of reducing the tackiness of the printed layer efficiently obtained. Further, in the step of expanding the paper-made container, a higher mass average molecular weight of the acryl-based resin increases the expansion inhibiting effect, since the glass transition point becomes higher even with the same materials and deformation does not easily occur with an increase in the viscosity or elasticity even when the resin is softened at a temperature higher than the glass transition point. In a case where the mass average molecular weight is 150,000 or less, the solubility of the acryl-based resins in the printing inks is not deteriorated. Further, the viscosity of the printing ink does not become too high, and thus, the coatability is not reduced.

The proportion of the acryl-based resin in the expansion inhibiting ink-coated portion 12 in the dry state is preferably 90% by mass or less so that a film made of the ink has a suitable hardness and excellent blocking resistance.

Examples of the cellulose-based resin having a glass transition temperature of 30° C. or higher include resins obtained by esterification of celluloses with carboxylic acids, such as acetic acid, butyric acid, propionic acid, acetic anhydride, and butyric anhydride. Examples of the esterified cellulose resin include a cellulose acetate resin, a cellulose acetate butyrate (CAB) resin, and a cellulose acetate propionate (CAP) resin, and preferably a cellulose acetate butyrate (CAB) resin and a cellulose acetate propionate (CAP) resin.

The esterification rate of the cellulose-based resin esterified with a carboxylic acid is preferably from 35% to 50%. Here, the esterification rate means the ratio of the esterified hydroxyl groups in the cellulose-based resin.

The mass average molecular weight of the cellulose-based resin esterified with a carboxylic acid is preferably from 12,000 to 75,000, and more preferably from 20,000 to 40,000. In a case where the mass average molecular weight is 12,000 or more, the blocking resistance is excellent. In a case where the mass average molecular weight is 75,000 or less, the viscosity of the printing ink is not increased, and thus, the gravure printability is excellent.

Furthermore, examples of a cellulose-based resin having a glass transition temperature of 30° C. or higher include nitrocellulose. The nitrocellulose is dinitrated cellulose in which about two out of three hydroxyl groups in the cellulose are nitrated. The nitrogen content in the nitrocellulose is preferably from 8% by mass to 20% by mass, and more preferably from 10% by mass to 13% by mass.

Based on differences in the degree of nitration, the nitrocelluloses are classified into RS type nitrocelluloses (regular soluble type nitrocelluloses; a nitrogen content of 11.8% to 12.2%), and SS type nitrocelluloses (spirit soluble type nitrocelluloses; a nitrogen content of 10.7% to 11.2%). The RS type nitrocellulose is dissolved in an ester-based or ketone-based solvent, and a hydrocarbon-based solvent can be used as a diluent. The SS type nitrocellulose is used in cases where an alcohol-based solvent is often used as a diluent.

As the vinyl chloride-vinyl acetate copolymer having a glass transition temperature of 30° C. or higher, a vinyl chloride-vinyl acetate copolymer having an amount of vinyl acetate in the copolymer of 20% by mass or less is preferred, and a vinyl chloride-vinyl acetate copolymer having an amount of vinyl acetate in the copolymer of 12% by mass or less is more preferred. That is, the amount of vinyl chloride in the vinyl chloride-vinyl acetate copolymer is preferably 80% by mass or more, and more preferably 88% by mass or more. By adopting an amount of vinyl chloride of 80% by mass or more, a resin having a high glass transition point is obtained.

Furthermore, if the amount of vinyl chloride is high, the toughness of the film is improved thereby improving the expansion inhibiting effect. If the amount of vinyl acetate is increased, the solubility, the flexibility, the adhesiveness, and the like of the film are improved. By adopting an amount of vinyl chloride of 80% by mass to 90% by mass, an expansion-inhibited ink having excellent toughness, solubility, flexibility, and adhesiveness to a film can be obtained.

In addition, the mass average molecular weight of the vinyl chloride-vinyl acetate copolymer is preferably from 10,000 to 50,000. If the molecular weight is increased, the film strength is improved, while the viscosity of a solution is increased and thus, the printed film becomes thin. Further, the solubility to a solvent is further deteriorated and thus, the dispersibility of the colorant is also deteriorated. In a case where the mass average molecular weight is in such a range, an expansion-inhibited ink having a balance among all of the film strength, the viscosity of a solution, the printed film, the solubility to a solvent, and dispersibility of a colorant is obtained. Further, the expansion-inhibited ink may include polyisocyanate which is used to improve the heat resistance and film strength, and may be used as a two-solution type ink.

The vinyl chloride-vinyl acetate copolymer may include a copolymer having materials other than vinyl chloride and vinyl acetate, such as a vinyl chloride-vinyl acetate-maleic acid copolymer and a vinyl chloride-vinyl acetate-vinyl alcohol copolymer, in a range of 5% or less. Since the maleic acid and vinyl alcohol have high polarity, the addition thereof increases the glass transition point of the copolymer. The amount of vinyl acetate in the vinyl chloride-vinyl acetate-maleic acid copolymer or the vinyl chloride-vinyl acetate-vinyl alcohol copolymer is preferably 20% by mass or less, and more preferably 12% by mass or less.

Examples of the UV-curable resin having a glass transition temperature of 30° C. or higher include those obtained by the polymerization of a composition containing an oligomer, a reactive diluent, and a photopolymerization initiator.

As the oligomer, a polymer having a repeating number of monomers of about 2 to 20 is preferred, which is also referred to as a prepolymer. Representative examples of the resin include polyester acrylates, epoxy acrylates, and urethane acrylates.

Examples of the reactive diluent (reducer) include monomers having a high boiling point and polyester acrylates having a low viscosity.

The photopolymerization initiator generates radicals (active species) by UV energy, which undergo a reaction in the reactive groups of monomers or oligomers, thereby initiating polymerization. Examples of the photopolymerization initiator include benzophenone-based, benzoin-based, acetophenone-based, and thioxanthone-based photopolymerization initiators.

In addition, an auxiliary agent which is referred to as a sensitizer may be used in combination therewith in order to promote the initiation reaction of the photopolymerization initiator.

The composition used to form a UV-curable resin may contain an inert resin, an inorganic resin, an organic filler, or the like depending on the desired outcome, such as improvement of the flexibility and blocking resistance of a resin.

The inert resin is a resin which does not contribute to radical polymerization caused by the irradiation of electron beams. In other words, the resin which does not cause radical polymerization by electron beams. The resin is not particularly limited as long as it has such the chemical properties. Specific examples of the inert resin include polyurethane resins, amino resins, phenol resins, polyamides, cellulose derivatives, vinyl-based resins, polyolefins, natural rubber derivatives, acrylic resins, epoxy resins, polyesters, polystyrenes, alkyd resins, rosin-modified alkyd resins, and linseed oil-modified alkyd resins, and these may be used alone or as a mixture of two or more kinds thereof. Among these, polyurethane resins and chlorinated polypropylene resins are preferred from the viewpoints of adhesiveness and flexibility.

Examples of the urethane resin having a glass transition temperature of 30° C. or higher include those obtained by a polyaddition reaction of a diisocyanate compound with a polyol compound and a low-molecular chain extending agent.

The urethane-based resins are classified into two types, a one-solution type resin and a two-solution type resin. The one-solution type resin is a thermoplastic resin having no terminal isocyanate, in which a reaction product of a polyester, an isocyanate, or the like having a terminal hydroxyl group with diisocyanate is used as a base, and from the resin, a printed film which is tough and has excellent flexibility is obtained. The two-solution type resin is formed by preparing an ink base with an acryl polyol, a polyether polyol, a vinyl chloride-vinyl acetate copolymer, an epoxy resin, or the like containing a functional group such as a hydroxyl group, and adding an isocyanate prepolymer (curing agent) thereto prior to the printing process. The two-solution type polyurethane are characterized by strong adhesion to a thermoplastic resin, and thus excellent film physical properties (water resistance, oil resistance, chemical resistance, and heat resistance).

Moreover, the expansion inhibiting ink-coated portion 12 may contain a chlorinated polypropylene or polyamide resin.

The chlorinated polypropylene has a molecular weight of several thousands to several tens of thousands, and preferably has a degree of chlorination of 25% by mass to 65% by mass. Further, the chlorinated polypropylene is preferably obtained by the chlorination of a polyolefin resin (polyethylene, polypropylene, or the like) with a chlorine gas. The highly chlorinated product having a chlorine content of 60% by mass or more has a low solution viscosity and excellent heat resistance, chemical resistance, or the like. The lower chlorinated product having a chlorine content of 20% to 40% has excellent adhesiveness to untreated polypropylene.

The polyamide resin is preferably a polycondensation product of dimeric acids of vegetable oil-derived fatty acids with diamines. The mass average molecular weight of the polyamide resin is preferably from 1000 to 20000, since when the mass average molecular weight is 1000 or more, it is unlikely to soften the polyamide resin during the heating, whereas when the mass average molecular weight is 20000 or less, the solution stability at a low temperature is high, and thus, the viscosity of the ink is not too high in any case. Preferably, the amine value is 15 or less and the acid value is 20 or less. If the acid value is 20 or less, the melting point of a polyamide resin composition thus obtained is not lowered and the blocking resistance or the heat resistance with heat sealing of a printed product is not deteriorated. Further, when the amine value is 15 or less, the printed product has neither a lower water resistance nor yellowed appearance in any case.

Among these resins having a glass transition point of 30° C. or higher, a vinyl chloride-vinyl acetate copolymer or a vinyl chloride-vinyl acetate-maleic acid copolymer is preferred, and a vinyl chloride-vinyl acetate copolymer or a vinyl chloride-vinyl acetate-maleic acid copolymer having 20% by mass or less of vinyl acetate is more preferred.

In the present embodiment, the expansion inhibiting ink-coated portion 12 may or may not contain a colorant. Examples of the colorant include dyes and pigments. The pigments are classified into inorganic pigments and organic pigments, but any type of colorants may be used. The amount of the resin contained in the expansion-inhibited ink which forms the expansion inhibiting ink-coated portion 12 is preferably 20% by mass or more in the dry state in order to obtain sufficient adhesiveness with a substrate. However, in order to make irregularities in appearance more visible, it is preferable that the colors of the expanded portion 4a and the expansion-inhibited portion 4b are not remarkably different from each other. For this, the expansion-inhibited ink preferably does not contain a colorant or does contain a colorant in the dry state in the amount of preferably 30% by mass or less, more preferably 20% by mass or less, and particularly preferably 10% by mass or less.

The expansion-inhibited ink-coated portion 12 may be colored or colorless. It is preferable that the expansion-inhibited ink-coated portion 12 be colorless or pale so that the irregularities of the expanded portion 4a and the expansion-inhibited portion 4b are more visible. Further, it is preferable that the expanded portion 4a and the expansion-inhibited portion 4b be colored with pale blue or green in cool colors, which is preferable because the irregularities easily seem to be deeply emphasized.

Furthermore, in the present embodiment, the expansion inhibiting ink-coated portion 12 may contain an auxiliary agent. As the auxiliary agent, the various existing waxes, for example, polyolefin-based waxes such as a polyethylene wax; and fatty acid amides, fatty acid esters, paraffin waxes, polytetrafluoroethylene (PTFE) waxes, and carnauba waxes may be used.

In addition, various additives for inks, such as a pigment dispersant, a leveling agent, a surfactant, and a plasticizer may be added, if desired.

Figure 2:
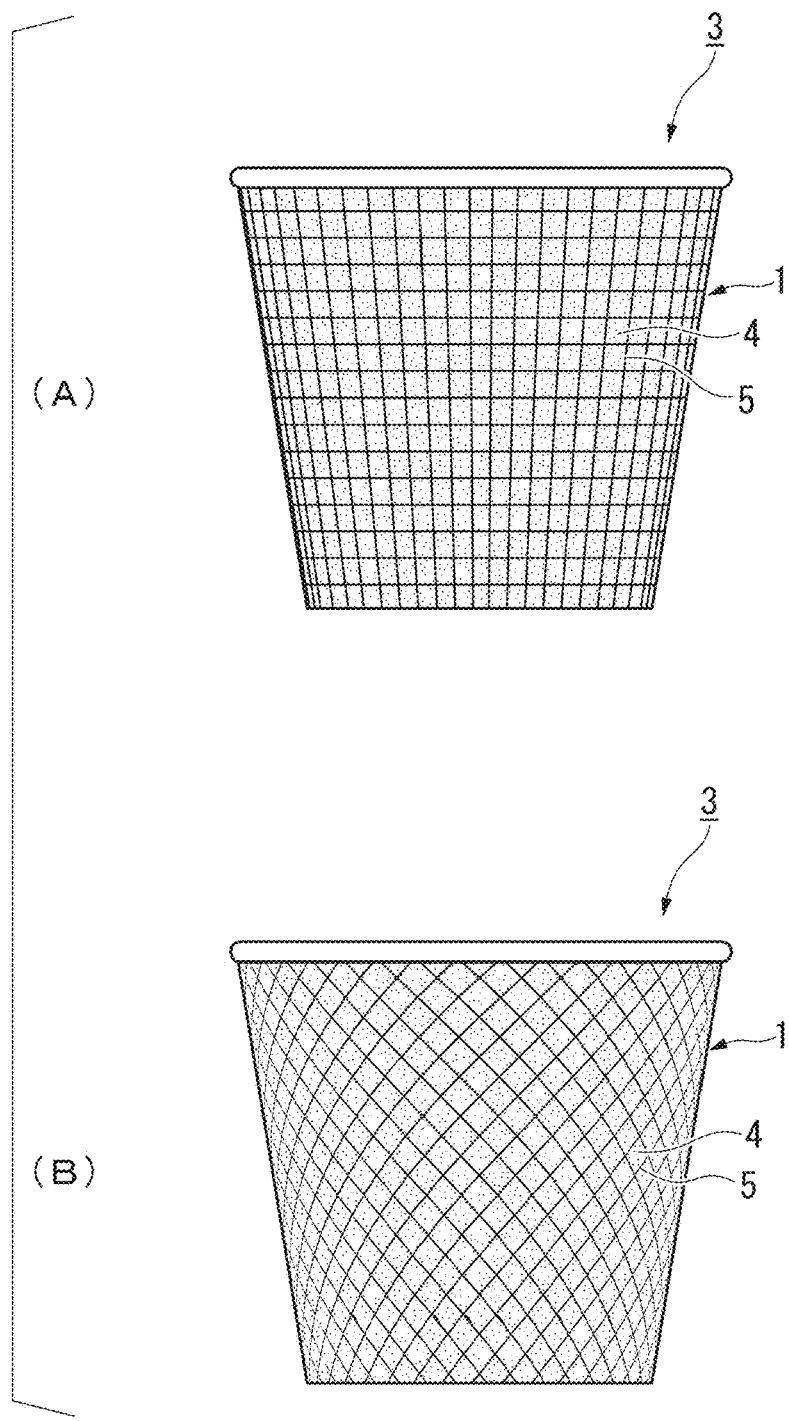
FIGS. 2(A) and 2(B) are front views which each show another example of an embodiment of the expanded insulating paper-made container.

As shown in FIG. 3, a concave portion 5 is formed of the expanded portion 4a and the expansion-inhibited portion 4b. The concave portion 5 may be provided on at least one portion of the surface of the expanded insulating layer 4, and for example, at the time of holding the container 3 with a hand, the concave portion 5 is preferably formed at a position where fingers are in contact with the barrel portion 1. In the present embodiment, as shown in FIG. 1, the concave portion 5 is formed on the surface of the expanded insulating layer 4 on the upper side of the barrel portion 1, but the position is not limited to this position and further, as shown in FIGS. 2(A) and 2(B), the concave portion 5 can be formed on the entire surface of the expanded insulating layer 4.

If the concave portion 5 is provided on the surface of the expanded insulating layer 4 provided on the side of the outer surface of the barrel portion 1, the concave portion 5 is seized so as that a part of the fingers grabs the container main body 3 across the concave portion 5 or over the concave portion 5 at the time of holding the container main body 3 with a hand, and thus the area of the expanded insulating layer 4 brought into contact with the fingers is decreased. As a result, the heat of the contents of the container main body 3, which is conducted to the surface of the expanded insulating layer 4 through the expanded insulating layer 4, is less transferred to the fingers, and thus, the sensible temperature felt by a hand at the time of holding the container with the hand is lowered.

The depth C of the concave portion 5 is preferably 200 μm or more (see FIG. 3). In a case where the depth C of the concave portion 5 is 200 μm or more, the fingers can be prevented from being in contact with the bottom surface of the concave portion 5 at the time of holding the container with a hand, and therefore, it can be unlikely to receive a heat sensation from the bottom surface of the concave portion 5.

The shape of the concave portion 5 is preferably a dot shape having a diameter A of 0.1 mm to 0.7 mm, a linear or lattice shape having a width B of 0.1 mm to 0.7 mm, or a shape formed by a combination thereof (see FIG. 3). The form in the dot shape is not limited to a circle as long as it has a size with a diameter A of 0.1 mm to 0.7 mm, and the form may be elliptical. Further, the line of the linear shape or lattice shape may be any one of a linear line, a curved line, and a dashed line.

In this way, the fingers are not in contact with the bottom surface of the concave portion 5 at the time of holding the barrel portion 1 with a hand. Further, the area of the expanded insulating layer 4 brought into contacts with the fingers is decreased, and thus, the sensible temperature at the time of holding the barrel portion 1 with a hand is lowered.

In a case where the diameter of the concave portion 5 in the dot shape is in the range of 0.1 mm or more, or a case where the width of the concave portion 5 in the linear shape or lattice shape is 0.1 mm or more, the contact area between the finger and the expanded insulating layer at the time of holding the container with a hand is decreased, and thus, the sensible temperature at the time of holding the barrel portion 5 with the hand is lowered. In addition, in a case where the diameter of the concave portion in the dot shape is in the range of 0.7 mm or less, and a case where the width of the concave portion 5 of the linear shape or lattice shape is 0.7 mm or less, it is unlikely for the fingers to be brought into contact with the bottom surface of the concave portion 5 and it is unlikely to receive a heat sensation from the bottom surface of the concave portion 5, at the time of holding the container with a hand.

Moreover, as shown in FIG. 3, in the same manner as for the concave portion 5, a convex portion 6 is formed of the expanded portion 4a and the expansion-inhibited portion 4b. That is, the convex portion 6 formed of the expanded insulating layer 4 between the concave portion 5 and the concave portion 5 preferably has a width D of 1.5 mm to 10 mm (see FIG. 3).

In a case where the width D of the convex portion 6 is 1.5 mm to 10 mm, the area of the expanded insulating layer 4 brought into contact with the finger at the time of holding the container with a hand can be remarkably reduced, and thus, the sensible temperature felt with the fingers at the time of holding the container with the hand can be further effectively lowered.

In a case where the width D of the convex portion 6 is 1.5 mm or more, an expansion thickness E of the expanded insulating layer 4 can be enough thickness to obtain enough insulation. Further, in a case where the width D of the convex portion 6 is 10 mm or less, the area of the expanded insulating layer 4 brought into contact with the finger at the time of holding the container with a hand is small and the sensible temperature felt with the fingers is reduced.

Furthermore, the proportion of the outer surface area of the concave portion 5 in the outer surface area of the barrel portion 1 is preferably from 1% to 55%. In a case where such a rate is from 1% to 55%, the area of the expanded insulating layer 4 brought into contact with the finger is small in any place of the barrel portion 1, and further, the fingers are prevented from being in contact with the bottom surface of the concave portion 5, and thus the container can be safe for use.

In a case where the proportion of the outer surface area of the concave portion 5 is 1% or more, the area of the expanded insulating layer 4 brought into contact with the finger is small, and the heat felt with the fingers at the time of holding the container with a hand is low. In a case where the proportion of the outer surface area of the concave portion 5 is 55% or less, it is unlikely for the fingers to be brought into contact with the bottom surface of the concave portion 5 and it is unlikely to receive a heat sensation from the bottom surface of the concave portion 5, at the time of holding the container with a hand.

<Method for Preparing Paper-Made Container>

The method for preparing a paper-made container of the present invention comprises: a step A in which a thermoplastic resin layer is provided on one surface of a paper substrate, a step B in which an expansion-inhibited ink is coated on a part of a surface of the thermoplastic resin layer, on the side opposite to the surface in contact with the paper substrate to form an expansion inhibiting ink-coated portion, and a step C in which the thermoplastic resin layer having the expansion inhibiting ink-coated portion is heated, a portion not provided with the expansion inhibiting ink-coated portion in the thermoplastic resin layer is expanded and an expanded portion and an expansion-inhibited portion is formed, wherein the expansion-inhibited ink contains a resin having a glass transition point of 30° C. or higher in an amount of 7% by mass or more.

Hereinafter, an example of the embodiments of the paper-made container according to the present invention will be described in detail with reference to the drawings.

The step A is a step of providing a thermoplastic resin layer (a low-melting point thermoplastic resin layer 8) on one surface of the paper substrate 7. The paper substrate 7, which is used as the container main body 3 constituted by the barrel portion 1 and the bottom plate portion 2, is composed mainly of chemical pulp and mechanical pulp obtained from wood, and if desired, non-wood pulp such as kenaf and bamboo can be blended therewith, and can be made by a usual paper making step. However, the paper making step is not limited thereto. The basis weight of the paper substrate 7 is preferably in a range of 100 g/m² to 500 g/m², considering the preparation of the container main body 3 and the rigidity of the container main body 3, but is not limited thereto.

Furthermore, the amount of moisture is preferably 5% by mass to 9% by mass, and more preferably 6% by mass to 8% by mass, in order to ensure a required expanding amount of the low-melting point thermoplastic resin layer 8 as described later as well as to prevent excessive expansion. In a case where the amount of moisture is 9% by mass or less, there is no risk that the moisture contained in the paper substrate 7 is evaporated by heating, and that the softened thermoplastic resin layer is excessively pushed out into the outside of the paper substrate and expanded by water vapor (moisture vapor). Therefore, according to the present embodiment, a blister-shape formation of the expanded portion and deterioration of the appearance can be effectively inhibited.

In the paper substrate 7, it is preferable to use a chemical pulp. The use of the chemical pulp tends to increase the density of the paper substrate 7 and can inhibit yellowing when irradiated with light over a long period of time or when stored at a high temperature, as compared with the use of the mechanical pulp. Further, the strength of the paper substrate 7 is further increased, and thus it is unlikely to fracture the paper substrate 7 when imparting top curl during the molding of a cup. The blending rate of chemical pulp is preferably 80% by mass or more, more preferably 90% by mass or more, and most preferably 95% by mass or more.

Furthermore, the density of the paper substrate 7 is preferably 0.7 g/cm³ or more, more preferably 0.75 g/cm³ or more, and particularly preferably 0.8 g/cm³ or more.

In the heating and expanding step of the step C as described later, the moisture of the paper substrate 7 evaporates to extend the thermoplastic resin layer outside and expand it, but in a case where the density of the paper substrate is 0.7 g/cm³ or more, it is unlikely to avoid the water vapor from the end face of the paper substrate and the expansion thickness increases, as compared with the paper substrate 7 having a low density with the same basis weight, which is thus preferable. A low-density paper substrate should have a high basis weight in order to obtain the same expansion thickness as a high-density paper substrate, and it is therefore necessary to use a lot of materials. On the other hand, in a case where the density of the paper substrate is 0.7 g/cm³ or more, it is not necessary to use a lot of materials, which is thus excellent from a viewpoint of cost.

The Canadian Standard Freeness (CSF) of the pulp for preparing the paper substrate 7 is preferably from 200 mL to 500 mL, and more preferably from 300 mL to 450 mL. In a case where the Canadian Standard Freeness is 500 mL or less, it is unlikely for the water vapor to penetrate into the paper substrate 7, and it is unlikely for the water vapor to escape from the end face of the paper substrate 7, thereby increasing the expansion thickness, which is thus preferable. In a case where the Canadian Standard Freeness is 200 mL or more, the power consumption for lowering the Canadian Standard Freeness by beating the pulp is not increased, which is thus excellent in terms of cost. Further, it is possible to relax the corresponding equipment to increase the pulp beating capacity.

The step B is a step of coating an expansion-inhibited ink on a part of a surface 8b on a side opposite to a surface 8a in contact with the paper substrate 7 of the low-melting point thermoplastic resin layer 8, to form an expansion inhibiting ink-coated portion 12.

In the present embodiment, a low-melting point thermoplastic resin which is expanded by heating is laminated on the side of one surface 7a (the side of the outer surface) of the paper substrate 7 by a melt extrusion method to produce a thickness in the range of 20 μm to 100 μm, thereby providing a low-melting point thermoplastic resin layer 8. At the same time, a high-melting point thermoplastic resin is laminated on the other surface 7b (the side of an inner surface) by a melt extrusion method to produce a thickness in the range of 15 μm to 60 μm to form a processed paper 10 for a barrel portion, in which a high-melting point thermoplastic resin layer 9 is provided (see FIG. 4).

As the low-melting point thermoplastic resin, a low-density polyethylene having a low melting point is used, and as the high-melting point thermoplastic resin, medium-density polyethylene, high-density polyethylene, polypropylene, polyethylene terephthalate, polybutylene terephthalate, trimethylpentene, or the like, each having a high melting point, is used.

In a case where the basis weight of the paper substrate 7 is high, the moisture amount is also high, and therefore, it is possible to widely expand the low-melting point thermoplastic synthetic resin layer. If the basis weight of the paper substrate 7 is high and the low-melting point thermoplastic synthetic resin layer is thick, the expansion thickness can be increased. If the basis weight of the paper substrate 7 is high and the low-melting point thermoplastic synthetic resin layer is thin, it is likely to break the expanded cells due to a too small thickness of the resin during the expanding and thus the appearance is deteriorated. As a result, a combination of the paper substrate 7 having a high basis weight and a thin laminate layer is not preferable. On the other hand, if the basis weight of the paper substrate 7 is low and the low-melting point thermoplastic synthetic resin layer is thick, the moisture amount of the paper substrate is small, and it is thus impossible to expand the thick laminate layer sufficiently, which is thus not economical. As a result, a combination of a paper substrate having a low basis weight and a thick laminate layer is not preferable.

Therefore, the basis weight X g/m$^2$ of the paper substrate and the thickness Y μm of the laminate layer of the low-melting point thermoplastic synthetic resin are represented by the relationship of the following equation (2), and Z is preferably in the range of 20 to 60.

[Equation 2]

$$Y = 0.33X - Z \quad (2)$$

Figure 4:
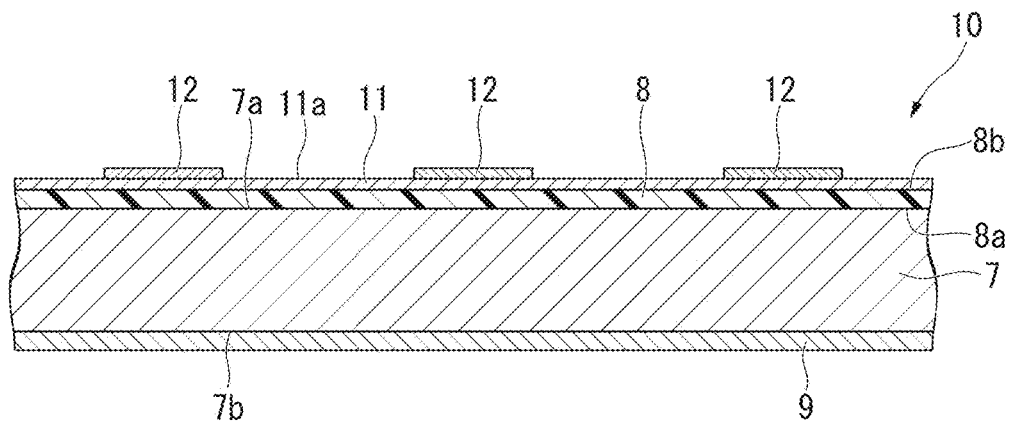
FIG. 4 is an enlarged cross-sectional view showing an example of a processed paper for a barrel portion used to form a barrel portion.

In the present embodiment, it is preferable to provide a less expansion-inhibited, printed layer 11 on a surface 8b of the low-melting point thermoplastic resin layer 8 by solid printing with a less expansion-inhibited ink which is less likely to inhibit expansion (see FIG. 4). That is, the step A is preferably a step of providing a low-melting point thermoplastic resin layer 8 on one surface of the paper substrate and then further providing a less expansion-inhibited, printed layer 11 on the low-melting point thermoplastic resin layer 8.

Figure 6:
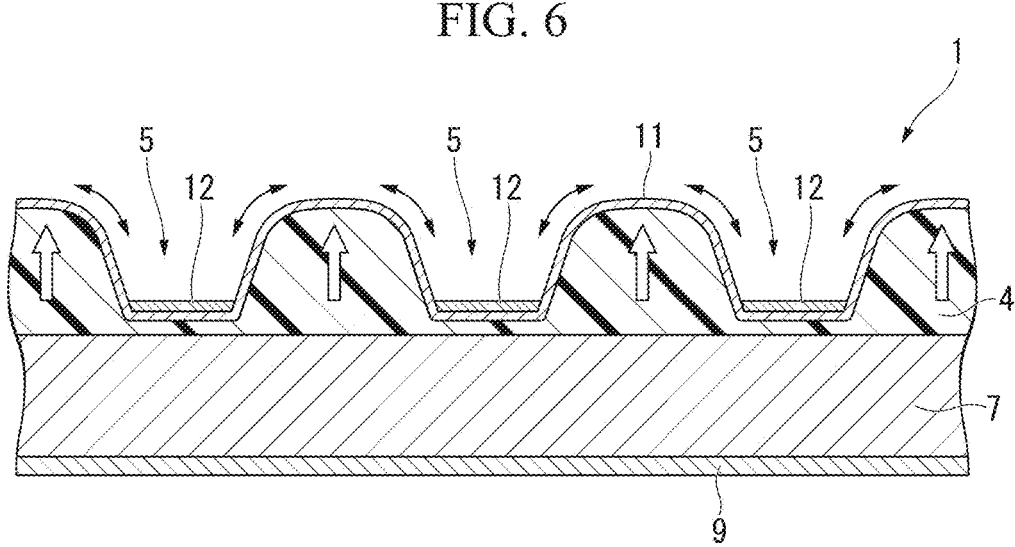
FIG. 6 is an enlarged explanatory cross-sectional view showing an expanded insulating layer when a low-melting point thermoplastic resin layer is expanded in a case where a less expansion-inhibited, printed layer is provided on a surface of the low-melting point thermoplastic resin layer.

If the less expansion-inhibited, printed layer 11 is provided on the surface 8b of the low-melting point thermoplastic resin layer 8, the expansion inhibiting ink-coated portion 12 serves as an anchor at the time of expanding the low-melting point thermoplastic resin layer 8, to halt the expansion of the excessive expansion of a blister shape in the expansion inhibiting ink-coated portion as well as to apply tension obliquely downward to the less expansion-inhibited, printed layer 11, thereby minimizing the deterioration of the appearance. In this way, excessive expansion of the low-melting point thermoplastic resin layer 8 is inhibited, which is thus preferable. (see FIG. 6)

In a case of the less expansion-inhibited, printed layer 11 without the expansion inhibiting ink-coated portion 12, the tension is transferred only in the lateral direction, and therefore, the effect of inhibiting the expansion of excessive expansion is small, leading to the occurrence of a widespread excessive expansion.

The thickness of the less expansion-inhibited, printed layer 11 is preferably from 0.5 μm to 10 μm. In a case where the thickness of the less expansion-inhibited, printed layer 11 is 0.5 μm or more, the expansion inhibiting rate with respect to the thickness of the expanded portion can be 75% or more, and also the pressure of the excessive expansion can be efficiently dispersed and relaxed, and in a case where the thickness is 10 μm or less, the materials are not wasted, which is economical.

The less expansion-inhibited ink may be coated on a portion other than the expansion-inhibited portion 4b. As an ink not inhibiting expanding, an ink containing a resin having a glass transition point of lower than 30° C. in the amount of 20% by mass or more in the dry state is preferred.

Examples of the resin having a glass transition point of lower than 30° C. include a polyamide-based resin, a urethane-based resin, and chlorinated polypropylenes, but an acryl-based resin, a vinyl chloride-vinyl acetate copolymer, nitrocellulose, or the like having a glass transition point of lower than 30° C. may also be used.

In order to form the concave portion 5 on a surface of the expanded insulating layer 4 formed by expanding the low-melting point thermoplastic resin layer 8, an expansion-inhibited ink is coated on a part of a surface 11a of the less expansion-inhibited, printed layer 11, thereby providing an expansion inhibiting ink-coated portion 12.

For the expansion-inhibited ink, a solvent is added to the above-described configuration of the expansion inhibiting ink-coated portion 12 in the dry state. That is, the expansion-inhibited ink contains a resin, a colorant, an auxiliary agent, and a solvent. The expansion-inhibited ink contains a resin having a glass transition point of 30° C. or higher in the amount of 7% by mass or more, preferably 9% by mass or more, more preferably 11% by mass or more, and particularly preferably 13% by mass or more.

Examples of the resin having a glass transition point of 30° C. or higher include at least one selected from the group consisting of an acryl-based resin, a cellulose-based resin, a vinyl chloride-vinyl acetate copolymer, a vinyl chloride-vinyl acetate-maleic acid copolymer, a UV-curable resin, and a urethane-based resin. A vinyl chloride-vinyl acetate copolymer or a vinyl chloride-vinyl acetate-maleic acid copolymer is preferable; and a vinyl chloride-vinyl acetate copolymer or a vinyl chloride-vinyl acetate-maleic acid copolymer, having an amount of vinyl acetate of 20% by mass or less, is more preferable.

In addition, the expansion-inhibited ink contains a colorant in an amount of preferably 7% by mass or less, more preferably 5% by mass or less, and particularly preferably 3% by mass or less.

The expansion inhibiting ink-coated portion 12 is formed by using gravure printing, flexographic printing, or other suitable printing means, but it can be formed by another means.

By printing the expansion-inhibited ink in the printing step instead of forming emboss using a mold, irregularities are imparted by an expanded portion and an expansion-inhibited portion after heating and expanding, and it is thus possible to design the container freely at low cost. A difficult and complex design, or a fine design, which is difficult to make by using a mold in an embossing process, can be performed. Thus, printing such as full monochromatic printing, full multi-color printing, partial printing, no printing, and the like can be freely combined herewith.

The expansion inhibiting ink-coated portion 12 forming the concave portion 5 may be provided on a surface 8a of the low-melting point thermoplastic resin layer 8, and then a less expansion-inhibited, printed layer 11 may be provided.

In this way, the expansion inhibiting ink-coated portion 12 may be provided on the surface 8a of the low-melting point thermoplastic resin layer 8 of a processed paper 10 for a barrel portion, and then the processed paper 10 for a barrel portion is punched to form a blank for a barrel portion (not shown).

Figure 5:
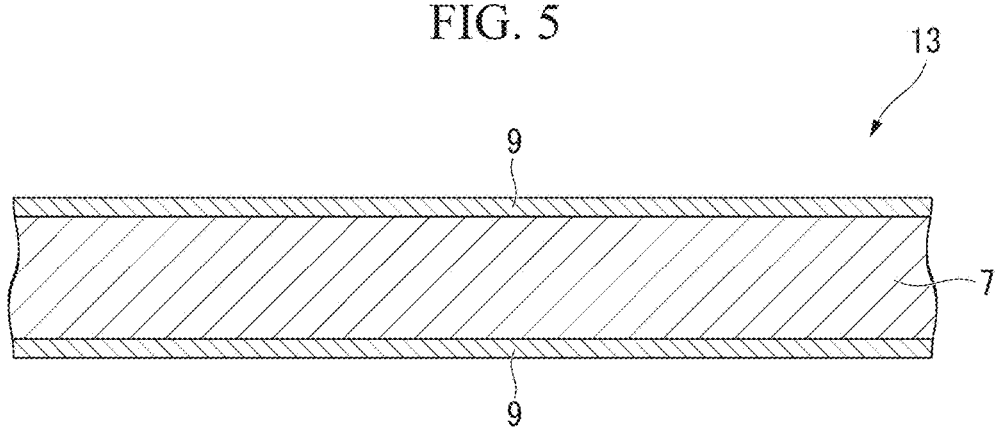
FIG. 5 is an enlarged cross-sectional view showing an example of a processed paper for a bottom plate portion used to form a bottom plate portion.

Moreover, in the bottom plate portion 3, a high-melting point thermoplastic resin 9 is laminated on one surface (a side of the inner surface) or both surfaces of the paper substrate 7 by a melt extrusion method to afford a thickness in the range of 15 μm to 60 μm to form a processed paper 13 for a bottom plate portion, in which the high-melting point thermoplastic resin layer 9 is provided (see FIG. 5), and the processed paper 13 for a bottom plate portion is punched to form a blank for a bottom plate portion (not shown).

Both edges of the blank for a barrel portion thus formed are superposed and adhered to form a barrel portion 1, and a blank for a bottom plate portion is fixed on the bottom portion of the barrel portion 1 to form a bottom plate portion 2, thereby forming a container main body 3.

The step C is a step of heating the low-melting point thermoplastic resin layer 8 having the expansion inhibiting ink-coated portion 12 to expand a portion in which the expansion inhibiting ink-coated portion 12 in the low-melting point thermoplastic resin layer 8 is not provided, thereby providing an expanded portion 4*a* and an expansion-inhibited portion 4*b*.

In the present embodiment, the container main body 3 is heated at a temperature in a range of about 110° C. to 140° C. by a heating dryer for about 40 seconds to 6 minutes.

By the moisture contained in the paper substrate 7 by heating, the low-melting point thermoplastic resin layer 8 is expanded to form an expanded insulating layer 4, but a portion in which the expansion inhibiting ink-coated portion 12 is provided on a surface of the low-melting point thermoplastic resin layer 8 is inhibited from being expanded by the expansion inhibiting ink-coated portion 12, and the inhibited portion is provided on a surface of the expanded insulating layer 4, thereby affording a concave portion 5.

At this time, if a less expansion-inhibited ink which does not inhibit the expanding is printed on the entire surface of the low-melting point thermoplastic resin layer 8 to provide a less expansion-inhibited, printed layer 11, the expansion inhibiting ink-coated portion 12 serves as an anchor at the time of expanding the low-melting point thermoplastic resin layer 8, and tension can be applied obliquely downward to the less expansion-inhibited, printed layer 11. Thereby the excessive expansion of the low-melting point thermoplastic resin layer 8 is effectively inhibited and the surface of the expanded insulating layer 4 is uniformly expanded. Thus, an improvement of smoothness or appearance can be achieved (see FIG. 6).

In addition, in a paper-made container for cooking the content or water contained in the paper-made container in a microwave, a linear groove or basal portion indicating a water-injection reference water level has a surface of the low-melting point thermoplastic resin which has been damaged due to compression stress before the expanding, and accordingly, by microwave heating, secondary expanding (excessive expansion) easily occurs.

Figure 7:
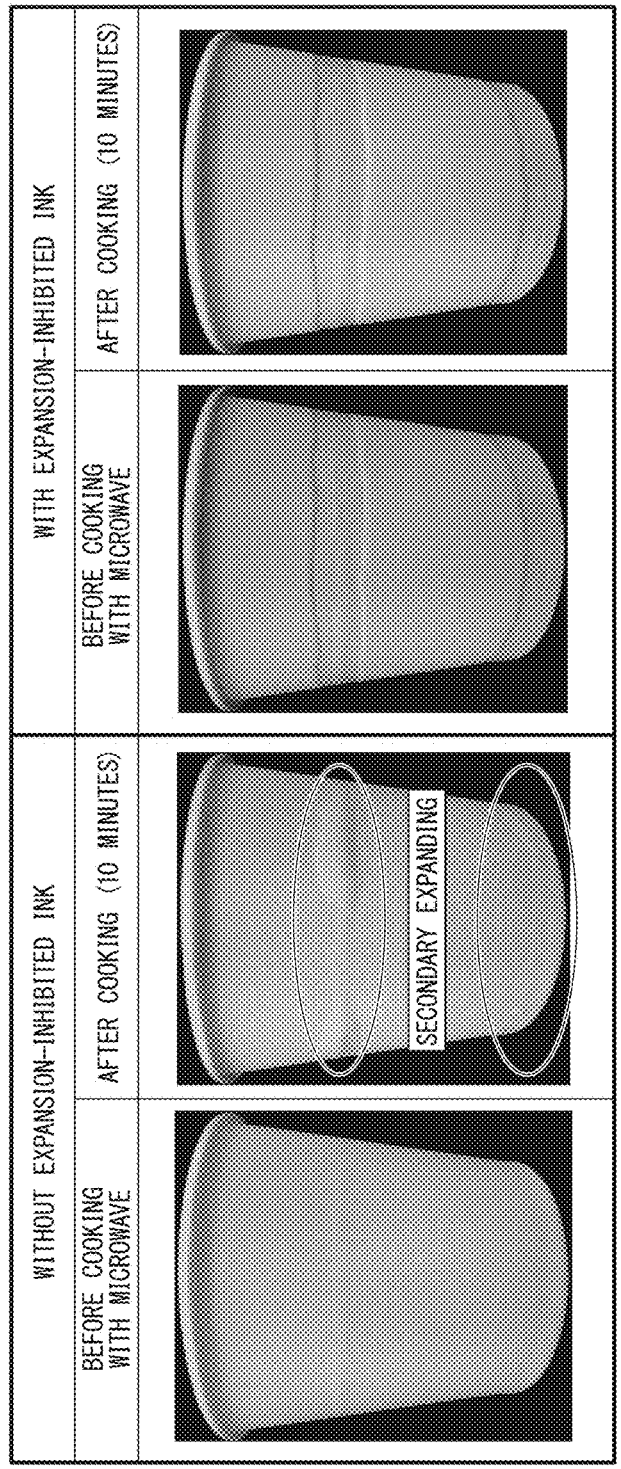
FIG. 7 is a view showing an example of a secondary expanding.
Figure 9:
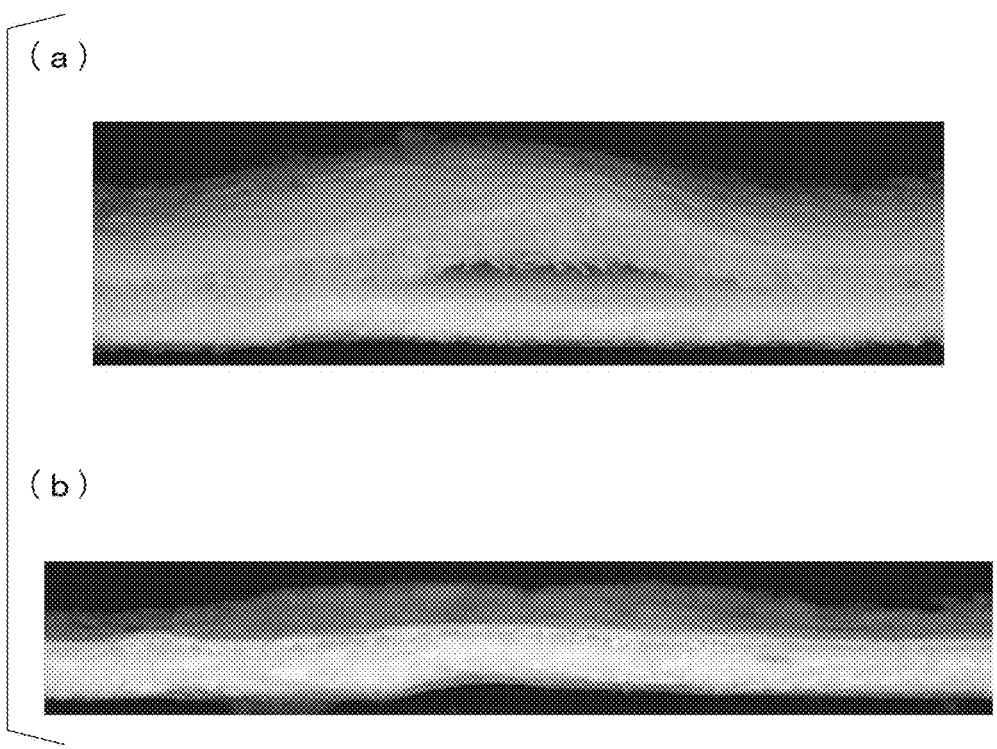
FIG. 9($a$) is a cross-sectional picture of a processed paper for a barrel portion, in which a secondary expanding occurs and FIG. 9($b$) is a cross-sectional picture of a processed paper for a barrel portion in which a secondary expanding is inhibited.

The secondary expanding by heating in a microwave has a mechanism different from that of excessive expansion by excessive base paper moisture or the like, in which expanded cells being combined together to be swollen, in that the expanded insulating layer and the base paper layer are peeled from each other. If a portion in which generation of secondary expanding is expected or a portion in which secondary expanding is easily generated is coated with an expansion-inhibited ink in advance, deterioration of the appearance can be prevented without the generation of secondary expanding, from which the expanded insulating layer and the base paper layer are peeled from each other (see FIG. 7). By way of an example, a cross-section in which secondary expanding is generated by a microwave is shown in FIG. 9(*a*), and a cross-section in which a less expansion-inhibited, printed layer is provided to inhibit the secondary expanding is shown in FIG. 9(*b*).

In the present embodiment, the container main body 3 is provided after the expansion inhibiting ink-coated portion 12 is formed, but the expansion inhibiting ink-coated portion 12 may also be formed after the container main body 3 is molded.

EXAMPLES

Figure 8:
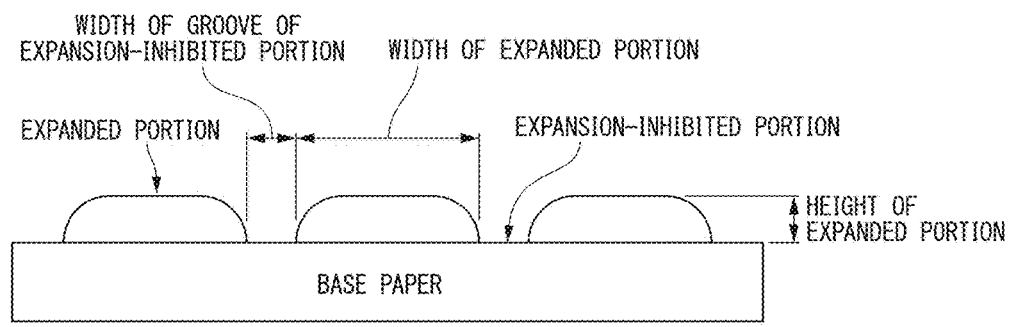
FIG. 8 is an explanatory view of an Example.

Next, the present invention will be described in more detail with reference to Examples, but the present invention is not limited to the Examples below. A detailed description of each of Examples and Comparative Examples is shown in Tables 1 and 2. The descriptions of the terms of Examples are shown in FIG. 8.

Example 1

A low-density polyethylene (trade name: PETROTHENE 213, manufactured by Tosoh Corporation, a density of 0.918 g/cm$^3$, and a melting point of 105° C.) was extruded and laminated on one surface of a paper substrate (220 g/m$^2$, a thickness of 259 μm, a density of 0.85 g/cm$^3$, 100% of chemical pulp, a Canadian Standard Freeness (CSF) of pulp of 400 ml, and a water content of 7.5%) to a thickness of 40 μm. A medium-density polyethylene (trade name: LC680, manufactured by Japan polyethylene Corporation, a density of 0.936 g/cm$^3$, a melting point of 118° C.) was extruded and laminated on one other surface of the paper substrate to a thickness of 20 μm. A less expansion-inhibited ink (in a dry state, 30% by mass of a urethane resin A (a glass transition point of 10° C.), 20% by mass of a nitrocellulose B (a glass transition point of 60° C.), 50% by mass of a colorant, and the total amount of the resin and the colorant in the state of dispersion in the solvent of 20% by mass) was coated on the entire film surface of the low-density polyethylene laminate, and dried to provide a less expansion-inhibited, printed layer having a thickness of 2.0 μm. As the solvent, a mixed solvent composed of isopropyl alcohol (10%)/ethyl acetate (40%)/toluene (30%)/methyl ethyl ketone (20%) was used.

Further, an expansion-inhibited ink (in a dry state, 70% by mass of a vinyl chloride-vinyl acetate copolymer C (a glass transition point of 70° C.), 30% by mass of an acrylic resin D (a glass transition point of 35° C.), 0% by mass of a colorant, and a resin content in the ink state of 10% by mass) was partially coated on the less expansion-inhibited, printed layer (see Tables 1 and 2), and dried to prepare an expansion-inhibited, printed layer having a thickness of 2.5 μm.

Figure 10:
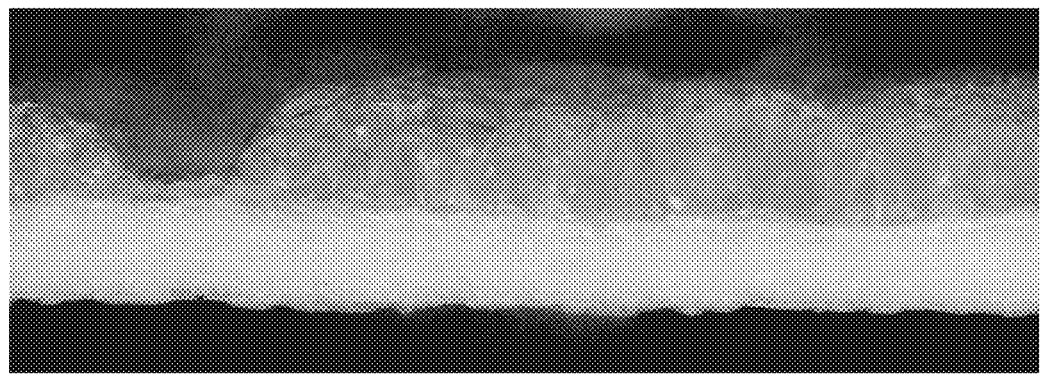
FIG. 10 is a cross-sectional picture of Example 1.

The total thickness (excluding the ink layer) of the double-sided laminate paper substrate was 319 μm. A barrel member blank of the container was punched from this double-sided laminate paper substrate. Then, a low-density polyethylene (manufactured by Tosoh Corporation trade name: PETROTHENE 213, a density of 0.918 g/cm$^3$, and a melting point of 105° C.) was extruded and laminated on one surface of the same base paper as one used for the barrel member having a basis weight of 220 g/m$^2$ to a thickness of 30 μm, and the bottom member blank of the container was punched from this one-sided laminate paper substrate. The barrel member blank of the container and the bottom member blank of the container were integrated by a cup molding device in common use so as to set the film surface of the medium-density polyethylene laminate of the barrel member blank of the container and the film surface of the low-density polyethylene laminate of the bottom member blank of the container as the inner surfaces of the container, thereby assembling a paper-made container. The dimensions of the container were as follows: a brim outer diameter of 72.5 mm, a cup height of 80 mm, a full-up capacity of 197 ml. This paper-made container was put into a conveyor oven and heated at 120° C. for 120 seconds. With the less expansion-inhibited, a printed layer provided on the low-density polyethylene laminate film of the barrel portion in the paper-made container, a paper-made container having an expanded insulating layer in the barrel portion was obtained. The thickness of the entire barrel portion in the paper-made container having the expanded insulating layer was 779 μm (an expanded insulating layer in 500 μm+a base paper in 259 μm+a medium-density polyethylene layer in 20 μm). The expansion inhibiting rate of the expansion-inhibited portion was 78.0% (see FIG. 10).

Comparative Example 1

The above-described low-density polyethylene was extruded and laminated on one surface of a paper substrate (220 g/m$^2$, a water content of 7.5%) to a thickness of 40 μm. The above-described medium-density polyethylene was extruded and laminated on the other surface of the paper substrate to a thickness of 20 μm. The above-described less expansion-inhibited ink was coated on the film surface of the low-density polyethylene laminate film. As the solvent, a mixed solvent composed of isopropyl alcohol (10%)/ethyl acetate (40%)/toluene (30%)/methyl ethyl ketone (20%) was used. The total thickness of this double-sided laminate paper substrate was 319 μm.

Figure 11:
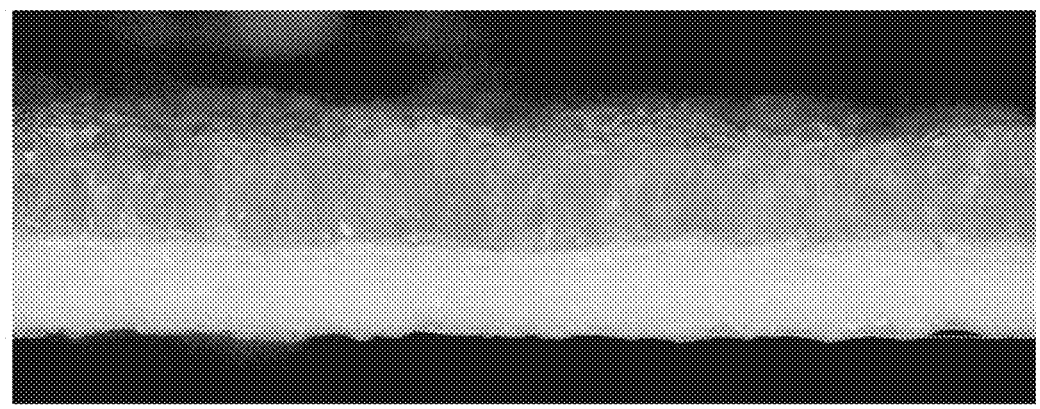
FIG. 11 is a cross-sectional picture of Comparative Example 1.

The barrel member blank of the container was punched from the double-sided laminate paper substrate. Then, a low-density polyethylene (manufactured by Tosoh Corporation trade name: PETROTHENE 213, a density of 0.918 g/cm$^3$, and a melting point of 105° C.) was extruded and laminated on one surface of the same base paper as one used for the barrel member having a basis weight of 220 g/m$^2$ to a thickness of 30 μm, and the bottom member blank of the container was blanked from this one-sided laminate paper substrate. The barrel member blank of the container and the bottom member blank of the container were integrated by a cup molding device in common use so as to set the film surface of the medium-density polyethylene laminate of the barrel member blank of the container and the film surface of the low-density polyethylene laminate of the bottom member blank of the container as the inner surfaces of the container, thereby assembling a paper-made container. This paper-made container was put into a conveyor oven and heated at 120° C. for 120 seconds. With the less expansion-inhibited, printed layer provided on the low-density polyethylene laminate film of the barrel portion in the paper-made container, a paper-made container having an expanded insulating layer in the barrel portion was obtained. The thickness of the entire barrel portion in the paper-made container having the expanded insulating layer was 789 μm (an expanded insulating layer in 510 μm+a base paper in 259 μm+a medium-density polyethylene layer in 20 μm). Since the expansion-inhibited portion was not provided, an expanded insulating layer having a uniform thickness was obtained and the expansion inhibiting rate of the expansion-inhibited portion was 0% (see FIG. 11).

Examples 2 to 6

Using a laminate paper substrate fabricated by the same method as in Example 1, paper-made containers in Examples 2 to 6 were fabricated. Details of the expanded portion and the expansion-inhibited portion in each of Examples are shown in Tables 1 and 2.

Comparative Example 2

Using a laminate paper substrate fabricated by the same method as in Comparative Example 1, a paper-made container in Comparative Example 2 was fabricated. Details of the expanded portion and the expansion-inhibited portion in Comparative Example 2 are shown in Table 1.

Example 7

A low-density polyethylene (trade name: PETROTHENE 213, manufactured by Tosoh Corporation, a density of 0.918 g/cm$^3$, and a melting point of 105° C.) was extruded and laminated on one surface of a paper substrate (280 g/m$^2$, a thickness of 315 μm, a density of 0.89 g/cm$^3$, 100% of chemical pulp, a Canadian Standard Freeness (CSF) of pulp of 400 ml, and a water content of 7.5%) to a thickness of 50 μm. A medium-density polyethylene (trade name: LC680, manufactured by Japan polyethylene Corporation, having a density of 0.936 g/cm$^3$, and a melting point of 118° C.) was extruded and laminated on one other surface of the paper substrate to a thickness of 40 μm. A less expansion-inhibited ink (in the dry state, 30% by mass of a urethane resin A (a glass transition point of 10° C.), 20% by mass of a nitrocellulose B (a glass transition point of 60° C.), 50% by mass of a colorant, and the total amount of the resin and the colorant in the state of dispersion in the solvent of 20% by mass) was coated on the entire film surface of the low-density polyethylene laminate, and dried to provide a less expansion-inhibited, printed layer having a thickness of 2.0 μm. As the solvent, a mixed solvent composed of isopropyl alcohol (10%)/ethyl acetate (40%)/toluene (30%)/methyl ethyl ketone (20%) was used.

Further, an expansion-inhibited ink (in the dry state, 70% by mass of a vinyl chloride-vinyl acetate copolymer C (a glass transition point of 70° C.), 30% by mass of an acrylic resin D (a glass transition point of 35° C.), 0% by mass of a colorant, and a resin content in the ink state of 10% by mass) was partially coated on the less expansion-inhibited, printed layer, and dried to prepare an expansion-inhibited, printed layer having a thickness of 2.5 μm.

The total thickness (excluding the ink layer) of the double-sided laminate paper substrate was 405 μm. A barrel member blank of the container was punched from this double-sided laminate paper substrate. Then, a low-density polyethylene (manufactured by Tosoh Corporation trade name: PETROTHENE 213, a density of 0.918 g/cm$^3$, and a melting point of 105° C.) was extruded and laminated on one surface of the same base paper as one used for the barrel member having a basis weight of 280 g/m$^2$ to a thickness of 40 μm, and a bottom member blank of the container was punched from this one-sided laminate paper substrate. The barrel member blank of the container and the bottom member blank of the container were integrated by a cup molding device in common use so as to set the film surface of the medium-density polyethylene laminate of the barrel member blank of the container and the film surface of the low-density polyethylene laminate of the bottom member blank of the container as the inner surfaces of the container, thereby assembling a paper-made container. The dimensions of the container are as follows: a brim outer diameter of 89 mm, a cup height of 107 mm, a full-up capacity of 402 ml. This paper-made container was put into a conveyor oven and heated at 120° C. for 360 seconds. With the less expansion-inhibited, printed layer provided on the low-density polyethylene laminate film of the barrel portion in the paper-made container, a paper-made container having an expanded insulating layer in the barrel portion was obtained. The thickness of the entire barrel portion in the paper-made container having the expanded insulating layer was 1065 μm (an expanded insulating layer in 710 μm+a base paper in 315

μm+a medium-density polyethylene layer in 40 μm). The expansion inhibiting rate of the expansion-inhibited portion was 82.4%.

Comparative Example 2

The above-described low-density polyethylene was extruded and laminated on one surface of a paper substrate (280 g/m², a water content of 7.5%) to a thickness of 50 μm. The above-described medium-density polyethylene was extruded and laminated on the other surface of the paper substrate to a thickness of 40 μm. The above-described less expansion-inhibited ink was coated on the film surface of the low-density polyethylene laminate film. As the solvent, a mixed solvent composed of isopropyl alcohol (10%)/ethyl acetate (40%)/toluene (30%)/methyl ethyl ketone (20%) was used. The total thickness of this double-sided laminate paper substrate was 405 μm.

The barrel member blank of the container was punched from the double-sided laminate paper substrate. Then, a low-density polyethylene (manufactured by Tosoh Corporation trade name: PETROTHENE 213, a density of 0.918 g/cm³, and a melting point of 105° C.) was extruded and laminated on one surface of the same base paper as one used for the barrel member having a basis weight of 280 g/m² to a thickness of 40 μm, and the bottom member blank of the container was punched from this one-sided laminate paper substrate. The barrel member blank of the container and the bottom member blank of the container were integrated by a cup molding device in common use so as to set the film surface of the medium-density polyethylene laminate of the barrel member blank of the container and the film surface of the low-density polyethylene laminate of the bottom member blank of the container as the inner surfaces of the container, thereby assembling a paper-made container. This paper-made container was put into a conveyor oven and heated at 120° C. for 360 seconds. With the less expansion-inhibited, printed layer provided on the low-density polyethylene laminate film of the barrel portion in the paper-made container, a paper-made container having an expanded insulating layer in the barrel portion was obtained. The thickness of the entire barrel portion in the paper-made container having the expanded insulating layer was 1065 μm (an expanded insulating layer in 710 μm+a base paper in 315 μm+a medium-density polyethylene layer in 40 μm). Since the expansion-inhibited portion was not provided, an expanded insulating layer having a uniform thickness was obtained and the expansion inhibiting rate of the expansion-inhibited portion was 0%.

[Evaluation of Insulating Property]

Figure 12:
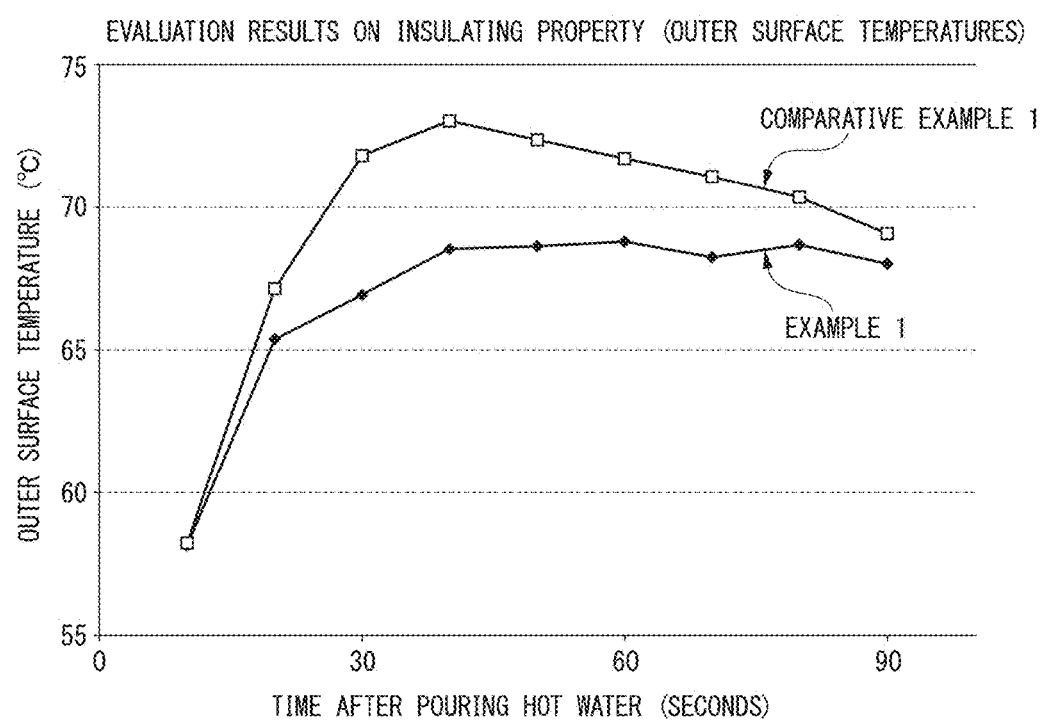
FIG. 12 is the result of the evaluation on the insulating properties of Example 1 and Comparative Example 1.

In the paper-made containers in Example 1 and Comparative Example 1, the relationship between the time lapse after pouring hot water and the temperature (outer surface temperature) of a copper plate brought into contact with the expanded insulating layer outside the paper-made container is shown in FIG. 12. Under the conditions of room temperature of 25° C., the container was filled with hot water of 87° C. up to 10 mm below the top, and a copper plate having an area of 3 cm×3 cm and a thickness of 12 μm was brought into contact with a position in the center in the height direction in the barrel portion of the container. Then, the temperature of the copper plate was measured by a contact type thermometer.

As shown in FIG. 12, the paper container of Example 1, having expansion-inhibited portion, had an excellent insulating property, as compared with Comparative Example 1.

In addition, in the paper-made containers in Examples 1 to 7 and Comparative Examples 1 and 2, the temperatures (temperatures of the outer surfaces) of the copper plates brought into contact with the expanded insulating layers outside the paper-made containers at 30 seconds and 60 seconds after pouring hot water are shown in Table 1.

As compared with Comparative Example 1, the paper containers in Examples 1 to 6, having the expansion-inhibited portions, the heat was slightly felt at the time of holding the container with a hand, and as shown in Table 1, demonstrating an excellent insulating property. Further, as compared with Comparative Example 2, in the paper container in Example 7 which has the expansion-inhibited portion, heat was not felt at the time of holding the container with a hand, and as shown in Table 1, the insulating property was excellent. In addition, with the paper-made container in Comparative Example 3 in a case where the water content of the base paper was 8.8%, excessive expansion was generated, but even when the water content of the base paper was the same, excessive expansion was not observed with the paper-made container in Example 8.

[Glass Transition Point of Expansion-Inhibited Ink]

Example 9

By the same method as in Example 1 except that the composition of the expansion-inhibited ink in the dry state was as follows: 50% by mass of a vinyl chloride-vinyl acetate copolymer C (a glass transition point of 70° C.) and 50% by mass of an acrylic resin D (a glass transition point of 35° C.), a paper-made container having an expanded insulating layer in the barrel portion was obtained. The expansion inhibiting rate was 77.4%.

Example 10

By the same method as in Example 1 except that the composition of the expansion-inhibited ink in the dry state was as follows: 30% by mass of a vinyl chloride-vinyl acetate copolymer C (a glass transition point of 70° C.) and 70% by mass of an acrylic resin D (a glass transition point of 35° C.), a paper-made container having an expanded insulating layer in the barrel portion was obtained. The expansion inhibiting rate was 76.4%.

Comparative Example 4

By the same method as in Example 1 except that the composition of the expansion-inhibited ink in the dry state was as follows: 60% by mass of a vinyl chloride-vinyl acetate copolymer C (a glass transition point of 70° C.), 30% by mass of an acrylic resin D (a glass transition point of 35° C.), and 10% by mass of an acrylic resin E (a glass transition point of 25° C.), a paper-made container having an expanded insulating layer in the barrel portion was obtained. The expansion inhibiting rate was 60.8%.

Comparative Example 5

By the same method as in Example 1 except that the composition of the expansion-inhibited ink in the dry state was as follows: 60% by mass of a vinyl chloride-vinyl acetate copolymer C (a glass transition point of 70° C.), 30% by mass of an acrylic resin D (a glass transition point of 35° C.), and 10% by mass of a urethane resin A (a glass transition point of 10° C.), a paper-made container having an expanded insulating layer in the barrel portion was obtained. The expansion inhibiting rate was 55.2%.

In Examples 9 and 10, a high expansion inhibiting effect with a high expansion inhibiting rate of 75 or more could be seen, but in Comparative Examples 4 and 5, the expansion inhibiting effect with an expansion inhibiting rate of below 75% was low.

TABLE 1

| | | | Example 1 | Comparative Example 1 | Example 2 | Example 3 | Example 4 | Example 5 |
|---|---|---|---|---|---|---|---|---|
| Paper substrate | Basis weight (g/m²) | | 220 | 220 | 220 | 220 | 220 | 220 |
| | Thickness (μm) | | 259 | 259 | 259 | 259 | 259 | 259 |
| | Density (g/cm³) | | 0.85 | 0.85 | 0.85 | 0.85 | 0.85 | 0.85 |
| | Moisture (%) | | 7.5 | 7.5 | 7.5 | 7.5 | 7.5 | 7.5 |
| Laminate layer | Side of inner surface (μm) | | 20 | 20 | 20 | 20 | 20 | 20 |
| | Side of the outer surface (μm) | | 40 | 40 | 40 | 40 | 40 | 40 |
| Total thickness | Paper substrate + laminate layer (μm) | | 319 | 319 | 319 | 319 | 319 | 319 |
| Ink layer | Thickness (μm) | Expansion-inhibited portion | 2.5 | None | 2.5 | 2.5 | 2.5 | 2.5 |
| | | Less expansion-inhibited portion | 2 | 2 | 2 | 2 | 2 | 2 |
| | Expansion-inhibited portion | Direction of grooves | Vertical | None | Vertical | Vertical | Vertical | Horizontal |
| | | Width (mm) of grooves | 0.3 | | 0.2 | 0.6 | 0.2 | 0.5 |
| | Width (mm) of less expanded portion | | 4 | None | 9 | 9 | 3 | 9 |
| Laminate layer after expanding | Thickness (μm) | Expansion-inhibited portion | 110 | — | 115 | 105 | 113 | 107 |
| | | Less expansion-inhibited portion | 500 | 500 | 503 | 500 | 490 | 500 |
| | | Depth* of concave portion | 390 | | 388 | 395 | 377 | 393 |
| | Expansion inhibiting rate (%) | | 78.0 | | 77.1 | 79.0 | 76.9 | 78.6 |
| Temperature | (i) Temperature (° C.) of hot water inside the cup | After 30 seconds | 82.2 | 82.8 | 82.4 | 82.0 | 82.3 | 82.1 |
| | | After 60 seconds | 80.8 | 81.5 | 81.1 | 80.5 | 81.0 | 80.7 |
| | (ii) Temperature (° C.) of copper plate brought into contact with expanded layer outside the cup | After 30 seconds | 67.0 | 71.8 | 67.7 | 67.1 | 66.4 | 66.9 |
| | | After 60 seconds | 68.9 | 71.7 | 69.3 | 69.0 | 68.6 | 68.8 |
| | Difference in temperatures ((i) − (ii)) | After 30 seconds | 15.2 | 11.0 | 14.8 | 14.9 | 15.9 | 15.2 |
| | | After 60 seconds | 11.9 | 9.8 | 11.8 | 11.5 | 12.4 | 12.0 |
| Note | | | | | The width of grooves in expansion-inhibited portion is small. The width of expanded portion is large. | The width of grooves in expansion-inhibited portion is large. The width of expanded portion is large. | The width of grooves in expansion-inhibited portion is small. The width of expanded portion is small. | The direction of grooves is horizontal. |

| | | | Example 6 | Example 7 | Comparative Example 2 | Example 8 | Comparative Example 3 |
|---|---|---|---|---|---|---|---|
| Paper substrate | Basis weight (g/m²) | | 220 | 280 | 280 | 220 | 220 |
| | Thickness (μm) | | 259 | 315 | 315 | 259 | 259 |
| | Density (g/cm³) | | 0.85 | 0.89 | 0.89 | 0.85 | 0.85 |
| | Moisture (%) | | 7.5 | 7.5 | 7.5 | 8.8 | 8.8 |
| Laminate layer | Side of inner surface (μm) | | 20 | 40 | 40 | 20 | 20 |
| | Side of the outer surface (μm) | | 40 | 50 | 50 | 40 | 40 |
| Total thickness | Paper substrate + laminate layer (μm) | | 319 | 405 | 405 | 319 | 319 |
| Ink layer | Thickness (μm) | Expansion-inhibited portion | 2.5 | 2.5 | None | 2.5 | None |

TABLE 1-continued

| | | | | | | | |
|---|---|---|---|---|---|---|---|
| | | Less expansion-inhibited portion | 2 | 2 | 2 | 2 | 2 |
| | Expansion-inhibited portion | Direction of grooves | Lattice | Vertical | None | Vertical | None |
| | | Width (mm) of grooves | 0.2 | 0.3 | | 0.3 | |
| | Width (mm) of less expanded portion | | 6 | 4 | None | 4 | None |
| Laminate layer after expanding | Thickness (μm) | Expansion-inhibited portion | 113 | 125 | — | 120 | — |
| | | Less expansion-inhibited portion | 495 | 710 | 710 | 520 | 520 |
| | | Depth* of concave portion | 382 | 585 | | 400 | |
| | Expansion inhibiting rate (%) | | 77.2 | 82.4 | | 76.9 | |
| Temperature | (i) Temperature (° C.) of hot water inside the cup | After 30 seconds | 82.0 | 83.4 | 83.6 | Excessive expanding not generated | Excessive expanding generated |
| | | After 60 seconds | 80.5 | 81.7 | 81.8 | | |
| | (ii) Temperature (° C.) of copper plate brought into contact with expanded layer outside the cup | After 30 seconds | 66.0 | 64.3 | 68.9 | | |
| | | After 60 seconds | 68.4 | 63.7 | 66.4 | | |
| | Difference in temperatures ((i) − (ii)) | After 30 seconds | 16.0 | 19.1 | 14.7 | | |
| | | After 60 seconds | 12.1 | 18.0 | 15.4 | | |
| Note | | | The direction of grooves is in a lattice shape. | Basis weight-up in Example 1 | Comparative Example of Example 7 | The base paper moisture content is low. | |

*Difference between the less expansion-inhibited portion and the expansion-inhibited portion

TABLE 2

| | Tg (°C.) | Example 1 | Example 9 | Example 10 | Comparative Example 4 | Comparative Example 5 |
|---|---|---|---|---|---|---|
| Urethane resin A | 10 | | | | 10 | |
| Nitrocellulose B | 60 | | | | | |
| Vinyl chloride-vinyl acetate copolymer C | 70 | 70 | 50 | 30 | 60 | 60 |
| Acrylic resin D | 35 | 30 | 50 | 70 | 30 | 30 |
| Acrylic resin E | 25 | | | 10 | | |
| Sum | | 100 | 100 | 100 | 100 | 100 |
| Expansion inhibition | | ○ | ○ | ○ | x | x |
| Thickness (μm) of expanded layer | Expansion-inhibited portion | 110 | 113 | 118 | 196 | 224 |
| | Less expansion-inhibited portion | 500 | 500 | 500 | 500 | 500 |
| | Depth of concave portion | 390 | 387 | 382 | 304 | 276 |
| Expansion inhibiting rate (%) | | 78.0 | 77.4 | 76.4 | 60.8 | 55.2 |

[Frictionally Charged Voltage]

A specimen in the sheet shape of the double-sided laminate paper substrate for the barrel member blank of the container, which is the same as in Example 1 and Comparative Example 1, was put into a conveyor oven, and the expanded specimen in the sheet shape, which had been heated at 120° C. for 120 seconds, was kept under the conditions of a temperature of 20° C. and a relative humidity of 20% for 24 hours. Subsequently, the film surface of the low-density polyethylene laminate and the film surface of the medium-density polyethylene laminate were superposed and rubbed 40 times with a hand, and then the charged voltage on the both sides were measured five times using an electrostatic fieldmeter (FMX-002, manufactured by SIMCO Japan Inc.). The average value of the values obtained by measuring the differences between the charged voltage on the film surface of the low-density polyethylene laminate and the charged voltage on the film surface of the high-density polyethylene laminate five times is shown in Table 3.

TABLE 3

|  | Average (kV) |
| --- | --- |
| Comparative Example 1 (before heating) | 1.74 |
| Comparative Example 1 (after heating) | 5.28 |
| Example 1 (before heating) | 0.06 |
| Example 1 (after heating) | 0.54 |

As shown in Table 3, it was confirmed that with the double-sided laminate paper substrate after heating in Example 1, frictionally charged voltage were not easily generated. Thus, it was confirmed that, for example, the containers using the double-sided laminate paper substrate in Example 1 were easily separated from the bundle of the paper-made containers in vending machines. It was also confirmed that in a case where hot beverage is sold at stores, the containers using the double-sided laminate paper substrate in Example 1 were easily pulled out of the bundle of the paper-made containers.

In addition, it was surprisingly confirmed that also with the double-sided laminate paper substrate before heating Example 1, frictionally charged voltage was not easily generated, as compared with the double-sided laminate paper substrate before heating in Comparative Example 1.

[Insulating Cup Separation Strength]

The bundles of the paper-made containers in Example 2 and Comparative Example 1 were subjected to pre-pressurization of 1 kg, and the separation strength was measured. The results are shown in Table 4.

TABLE 4

|  | Pre-pressurization 1 kg |
| --- | --- |
| Comparative Example 1 | Maximum value 741 g |
|  | Minimum value 408 g |
|  | Average value 519.7 g |
| Example 2 | Maximum value 585 g |
|  | Minimum value 435 g |
|  | Average value 479.5 g |

As shown in Table 4, it was confirmed that the paper-made containers in Example 2 had low separation strength, and were easily separated even though pressurization on the bundle of the paper-made containers occurred during the transportation, as compared with the paper-made container in Comparative Example 1.

REFERENCE SIGNS LIST

1: BARREL PORTION, 2: BOTTOM PLATE PORTION, 3: CONTAINER MAIN BODY, 4: EXPANDED INSULATING LAYER, 4a: EXPANDED PORTION, 4b: EXPANSION-INHIBITED PORTION, 5: CONCAVE PORTION, 6: CONVEX PORTION, 7: PAPER SUBSTRATE, 7a: SURFACE, 7b: SURFACE, 8: LOW-MELTING POINT THERMOPLASTIC RESIN LAYER, 8a: SURFACE, 8b: SURFACE, 9: HIGH-MELTING POINT THERMOPLASTIC RESIN LAYER, 10: PROCESSED PAPER FOR BARREL PORTION, 11: LESS EXPANSION-INHIBITED, PRINTED LAYER, 11a: SURFACE, 12: EXPANSION INHIBITING INK-COATED PORTION, 13: PROCESSED PAPER FOR BOTTOM PLATE PORTION.

The invention claimed is:

1. A paper-made container comprising:
a container main body consisting of a barrel portion and a bottom plate portion, and
an expanded insulating layer consisting of an expanded portion and an expansion-inhibited portion, provided on the side of the outer surface of the barrel portion,
wherein the expanded insulating layer is formed by heating a thermoplastic resin layer having an expansion inhibiting ink-coated portion, and the ratio of the thickness of the expansion-inhibited portion to the thickness of the expanded portion which is not subjected to expansion inhibition is 25% or less.

2. The paper-made container according to claim 1, wherein the thermoplastic resin layer is formed by lamination of a low-melting point thermoplastic resin layer and a less expansion-inhibited printed layer in this order from the side of the barrel portion.

3. The paper-made container according to claim 1, wherein the expansion inhibiting ink-coated portion contains a colorant in the amount of 30% by mass or less in the dry state.

4. The paper-made container according to claim 1, wherein the depth of a concave portion formed of the expanded portion and the expansion-inhibited portion is 200 μm or more.

5. The paper-made container according to claim 1, wherein the shape of the concave portion formed of the expanded portion and the expansion-inhibited portion is a dot shape having a diameter of 0.1 mm to 0.7 mm, a linear or lattice shape having a width of 0.1 mm to 0.7 mm, or a shape formed by a combination thereof.

6. The paper-made container according to claim 1, wherein the width of a convex portion formed of the expanded portion and the expansion-inhibited portion is from 1.5 mm to 10 mm.

7. The paper-made container according to claim 1, wherein the proportion of the outer surface area of the concave portion in the outer surface area of the barrel portion is from 1% to 55%.

8. The paper-made container according to claim 1, wherein the expansion inhibiting ink-coated portion contains a resin having a glass transition point of 30° C. or higher in the amount of 90% by mass or more in the dry state.

9. The paper-made container according to claim 8, wherein the resin having a glass transition point of 30° C. or higher is at least one selected from the group consisting of an acryl-based resin, a cellulose-based resin, a vinyl chloride-vinyl acetate copolymer, a vinyl chloride-vinyl acetate-maleic acid copolymer, a UV-curable resin, and a urethane resin.

10. The paper-made container according to claim 8, wherein the resin having a glass transition point of 30° C. or higher is a vinyl chloride-vinyl acetate copolymer or a vinyl chloride-vinyl acetate-maleic acid copolymer, and the proportion of vinyl acetate in the vinyl chloride-vinyl acetate copolymer or the vinyl chloride-vinyl acetate-maleic acid copolymer is 20% by mass or less.

11. A method for preparing a paper-made container, comprising:
    a step A in which a thermoplastic resin layer is provided on one surface of a paper substrate;
    a step B in which an expansion-inhibited ink is coated on a part of a surface of the thermoplastic resin layer on the side opposite to the surface in contact with the paper substrate, in order to form an expansion inhibiting ink-coated portion; and
    a step C in which the thermoplastic resin layer having the expansion inhibiting ink-coated portion is heated, a portion not provided with the expansion inhibiting ink-coated portion in the thermoplastic resin layer is expanded and an expanded portion and an expansion-inhibited portion is formed,
    wherein the expansion-inhibited ink contains a resin having a glass transition point of 30° C. or higher in the amount of 7% by mass or more.

12. The method for preparing a paper-made container according to claim 11, wherein, in the step A, a low-melting point thermoplastic resin layer is provided on one surface of the paper substrate, and then a less expansion-inhibited, printed layer is provided on the low-melting point thermoplastic resin layer.

13. The method for preparing a paper-made container according to claim 11, wherein the resin having a glass transition point of 30° C. or higher is at least one selected from the group consisting of an acryl-based resin, a cellulose-based resin, a vinyl chloride-vinyl acetate copolymer, a vinyl chloride-vinyl acetate-maleic acid copolymer, a UV-curable resin, and a urethane resin.

14. The method for preparing a paper-made container according to claim 11, wherein the resin having a glass transition point of 30° C. or higher is a vinyl chloride-vinyl acetate copolymer or a vinyl chloride-vinyl acetate-maleic acid copolymer, and the proportion of vinyl acetate in the vinyl chloride-vinyl acetate copolymer or the vinyl chloride-vinyl acetate-maleic acid copolymer is 20% by mass or less.

15. The method for preparing a paper-made container according to claim 11, wherein the expansion-inhibited ink contains a colorant in the amount of 7% by mass or less.

* * * * *